(12) United States Patent
Aweya et al.

(10) Patent No.: US 9,112,631 B2
(45) Date of Patent: Aug. 18, 2015

(54) METHOD AND DEVICES FOR FREQUENCY DISTRIBUTION

(71) Applicants: Khalifa University of Science, Technology, and Research, Abu Dhabi (AE); British Telecommunications plc, London (GB); Emirates Telecommunications Corporation, Abu Dhabi (AE)

(72) Inventors: James Aweya, Abu Dhabi (AE); Nayef Al Sindi, Abu Dhabi (AE); Saeed Al-Zubaidi, Abu Dhabi (AE)

(73) Assignees: Khalifa University of Science, Technology, and Research, Abu Dhabi (AE); British Telecommunications PLC, London (GB); Emirates Telecommuinications Corporation, Abu Dhabi (AE)

( * ) Notice: Subject to any disclaimer, the term of this patent is extended or adjusted under 35 U.S.C. 154(b) by 108 days.

(21) Appl. No.: 14/023,815

(22) Filed: Sep. 11, 2013

(65) Prior Publication Data

US 2015/0071309 A1    Mar. 12, 2015

(51) Int. Cl.
*H04J 3/06* (2006.01)

(52) U.S. Cl.
CPC ............. *H04J 3/0682* (2013.01); *H04J 3/0664* (2013.01); *H04J 3/0697* (2013.01)

(58) Field of Classification Search
None
See application file for complete search history.

(56) References Cited

U.S. PATENT DOCUMENTS

| | | | |
|---|---|---|---|
| 7,379,480 B2 * | 5/2008 | Balasubramanian et al. | 370/516 |
| 8,416,763 B1 | 4/2013 | Montini et al. | |
| 2005/0207387 A1 * | 9/2005 | Middleton et al. | 370/347 |
| 2010/0158051 A1 | 6/2010 | Hadzic et al. | |
| 2011/0122775 A1 * | 5/2011 | Zampetti et al. | 370/242 |
| 2011/0134766 A1 * | 6/2011 | Zampetti et al. | 370/252 |

(Continued)

FOREIGN PATENT DOCUMENTS

EP    2487819    8/2012

OTHER PUBLICATIONS

L. Cosart, "NGN packet network synchronization measurement and analysis," IEEE Commun. Mag., Feb. 2011, pp. 148-154.

(Continued)

*Primary Examiner* — Min Jung
(74) *Attorney, Agent, or Firm* — Calfee Halter & Griswold LLP

(57) ABSTRACT

This invention relates to methods and devices for frequency distribution based on, for example, the IEEE 1588 Precision Time Protocol (PTP). Packet delay variation (PDV) is a direct contributor to the noise in the recovered clock and various techniques have been proposed to mitigate its effects. Embodiments of the invention provide a mechanism to directly measure and remove PDV effects in the clock recovery mechanism at a slave clock. One particular embodiment provides a clock recovery mechanism including a phase-locked loop (PLL) with a PDV compensation feature built-in. An aim of the invention is to enable a slave clock to recover the master clock to a higher quality as if the communication path between master and slave is free of PDV. This technique may allow a packet network to provide clock synchronization services to the same level as time division multiplexing (TDM) networks and Global Positioning System (GPS).

34 Claims, 20 Drawing Sheets

(56) References Cited

U.S. PATENT DOCUMENTS

| | | |
|---|---|---|
| 2011/0200051 A1 | 8/2011 | Rivaud et al. |
| 2013/0034197 A1* | 2/2013 | Aweya et al. ............... 375/362 |
| 2013/0100832 A1 | 4/2013 | Flinn et al. |
| 2013/0129345 A1* | 5/2013 | Meng et al. ................. 398/25 |

OTHER PUBLICATIONS

K. Shenoi, "Performance aspects of timing in next-generation networks," IEEE Commun. Mag., Feb. 2011, pp. 156-162.

Ilija Hadzic and Dennis R. Morgan, "On packet selection criteria for clock recovery," ISPCS 2009, Oct. 12-16, 2009, pp. 1-6.

* cited by examiner

- Clock Noise* = Slave + Transparent Clock Noise
- PDV >> Clock Noise
- Approach: Use Transparent Clocks to correct for PDV, and PLL to filter out clock noise

METHOD AND DEVICES FOR FREQUENCY DISTRIBUTION

FIELD OF THE INVENTION

The present invention relates to methods and devices for frequency distribution. It is particularly, but not exclusively, concerned with providing a mechanism to directly measure and remove packet delay variation effects in the clock recovery mechanism at a slave clock.

BACKGROUND OF THE INVENTION

IEEE 1588 Precision Time Protocol ("PTP") is defined in the IEEE 1588-2002 (Version 1) and 1588-2008 (Version 2) standards. IEEE 1588 has been designed as an improvement to current methods of synchronization within a distributed network of devices. It is designed for systems requiring very high accuracies beyond those attainable using Network Time Protocol (NTP). Unlike NTP, IEEE 1588 uses 'hardware timestamping' approach to deliver timing accuracy well under a microsecond. It is also designed for applications that cannot bear the cost of a GPS receiver at each node, or for which GPS signals are inaccessible.

IEEE 1588 is now the industry accepted packet-based method/standard to synchronize the clocks of distributed systems with high precision (accuracies in the nanosecond levels). PTP is a message based protocol that can be implemented across packet based networks including, but not limited to, Ethernet. Its underlying principle is a master/slave concept based on the regular exchange of synchronization messages. IEEE 1588 synchronizes all clocks within a network by allowing clocks to adjust their frequency/time to the highest quality clock (the GrandMaster clock).

The IEEE 1588 standard defines the set descriptors that characterize a clock, the states of a clock and the allowed state transitions. It defines network messages, fields and semantics, the datasets maintained by each clock and the actions and timing for all IEEE 1588 network and internal events. It also describes a suite of messages used for monitoring the system, specifications for an Ethernet-based implementation and conformance requirements and gives some implementation suggestions.

A complete IEEE 1588-based solution includes servo (control) algorithms, filters, and PTP-clock based on hardware timer and direct timer access. The IEEE 1588 standards define a wide range of synchronization capabilities except the clock recovery mechanisms (servo algorithm, PLL, timers, etc.) to be used at the receiver (slave) to synchronize its local clock to the master. The last pieces are vendor and proprietary solutions and are often product differentiators.

The primary challenge in designing a clock distribution system for packet networks is dealing with packet delay variations (PDVs)—that is, the variable packet transit delays. Typically, a protocol such as IEEE 1588 PTP is used for distributing timing information from a master to one or more slaves. A clock recovery mechanism at a slave then uses this timing information to recover the master clock. PDV is a direct contributor to the noise in the recovered clock and various techniques are necessary to mitigate its effects.

Packet delay variation (PDV) is therefore the main factor affecting the accuracy and stability of slave clocks when using packet timing protocols such as IEEE 1588 PTP. Packet network devices such as switches and routers introduce a variable delay to packets (PDV) that inhibits accurate path delay measurements and clock synchronization. Even for techniques that do not require path delay measurements for clock synchronization, the PDV is a direct contributor to the noise in the recovered clock. The PDV inherent in packet networks is a primary source of clock noise. The higher the clock noise, the poorer the clock quality rendering the recovered clock sometimes unusable for end system applications when the noise exceeds application defined thresholds. The term "clock noise" used herein refers to all impairments to the timing information recovered at the slave including jitter, wander, and other imperfections in the recovered clock.

For instance, for time synchronization, the variation in delay from packet to packet through the network induces noise in the slave's perception of the time at the master. Constant delay would cause a fixed offset, however variable delay causes a varying estimate of the offset. The performance of the slave is affected by both the magnitude of this variation, and how effective the slave's filter is at removing this noise.

Transparent clocks have been introduced in IEEE 1588 Version 2 to allow them to measure actual packet delays and to communicate these delay measurements to slaves. The slave can then correctly adjust its clock while compensating for the actual delay variations. This is to allow the slaves to remove the negative effects that these delay variations cause. It is an object of the present invention to provide a new clock recovery mechanism that directly accounts and compensates for PDV effects on the communication path between a master and a slave clock.

Overview of IEEE 1588v2 PTP

The GrandMaster (GM) is the root timing reference in a domain and transmits synchronization information to the clocks residing in its domain. In IEEE 1588v2 PTP messages are categorized into event and general messages. All IEEE 1588 PTP messages have a common header. Event messages are timed messages in that an accurate timestamp is generated at both transmission and receipt of each message. Event messages have to be accurately timestamped since the accuracy in transmission and receipt timestamps directly affects clock distribution accuracy. A timestamp event is generated at the time of transmission and reception of any event message. General messages are not required to be timestamped. The set of event messages consists of Sync, Delay_Req, Pdelay_Req, and Pdelay_Resp. The set of general messages consists of Announce, Follow_Up, Delay_Resp, Pdelay_Resp_Follow_Up, Management, and Signaling.

IEEE 1588 PTP allows for two different types of timestamping methods, either one-step or two-step. One-step clocks update time information within event messages (Sync and Delay-Req) on-the-fly, while two-step clocks convey the precise timestamps of packets in general messages (Follow_Up and Delay_Resp).

The Sync, Delay_Req, Follow_Up, and Delay_Resp messages are used to generate and communicate the timing information needed to synchronize ordinary and boundary clocks (described in more detail below) using the delay request-response mechanism. A Sync message is transmitted by a master to its slaves and either contains the exact time of its transmission or is followed by a Follow_Up message containing this time. In a two-step ordinary or boundary clock, the Follow_Up message communicates the value of the departure timestamp for a particular Sync message. A Delay_Req message is a request for the receiving node to return the time at which the Delay_Req message was received, using a Delay_Resp message.

The basic pattern of synchronization message exchanges for the one-step and two-step clocks are illustrated in FIG. 1 and FIG. 2, respectively. The message exchange pattern for the two-step clock can be explained as follows. The master 1 sends a Sync message to the slave 3 and notes the time $T_1$ at which it was sent according to its clock 4. The slave 3 receives the Sync message and notes the time of reception $T_2$. The master 1 conveys to the slave 3 the timestamp $T_1$ by one of two ways: 1) Embedding the timestamp $T_1$ in the Sync message. This requires some sort of hardware processing (i.e., hardware timestamping) for highest accuracy and precision. 2) Embedding the timestamp $T_1$ in a Follow_Up message. Next, the slave 3 sends a Delay_Req message to the master and notes the time $T_3$ at which it was sent. The master 1 receives the Delay_Req message and notes the time of reception $T_4$. The master 1 conveys to the slave 3 the timestamp $T_4$ by embedding it in a Delay_Resp message.

At the end of this PTP messages exchange, the slave 3 possesses all four timestamps $\{T_1, T_2, T_3, T_4\}$. These timestamps may be used to compute the offset of the slave's clock 5 with respect to the master clock 4 and the mean propagation time of messages between the two clocks. The computation of offset and propagation time assumes that the master-to-slave and slave-to-master propagation times are equal, i.e. that there is a symmetrical communication path.

Like NTP, PTP requires an accurate measurement of the communication path delay between the time server (master) and the client (slave). PTP measures the exact message transmit time and receive times and uses these times to calculate the communication path delay and clock offset. This delay measurement principle determines path delay between devices on the network and the local clocks are adjusted for this delay using the series of messages sent between masters and slaves (FIG. 1 and FIG. 2). The one-way delay time is calculated by averaging the path delay of the transmit and receive messages. This calculation assumes a symmetrical communication path.

However, switched networks do not necessarily have symmetrical communication paths, due to the buffering process in the network nodes, which can result in asymmetrical packet delay times. To address this, PTP provides a method, using transparent clock devices (implemented in switches and routers), to measure and account for the delay experienced by PTP messages in a time interval field in the PTP messages. This setup makes the switches and routers temporarily transparent (from a synchronization viewpoint) to the master and slave nodes on the network.

Best Master Clock (BMC) Algorithm

The BMC specifies how each clock on the network determines the best clock that can serve as master in its subdomain out of all the clocks it can see, including itself. The BMC algorithm runs on the network continuously and quickly adjusts for changes in network configuration. The BMC uses the following criteria to determine the best master clock in the subdomain:

Clock quality (for example, GPS is considered the highest quality)

Clock accuracy of the clock's time base

Stability of the local oscillator

Closest clock to the GM

In addition to identifying the best master clock, the BMC algorithm also ensures that clock conflicts do not occur on the PTP network by ensuring that clocks do not have to negotiate with one another, and there is no misconfiguration, such as two master clocks or no master clocks, as a result of the master clock identification process.

PTP Clocks

A PTP network is made up of PTP-enabled devices and devices that are not using PTP. The PTP-enabled devices typically consist of the following clock types.

GrandMaster Clock

Within a PTP domain, the GM clock is the primary source of time for clock synchronization using PTP. The GM clock usually has a very precise time source, such as a GPS or atomic clock. When the network does not require any external time reference and only needs to be synchronized internally, the GM clock can free run.

Ordinary Clock

This is a single port device that can be a master or slave within a subdomain. It can be selected as a master or slave within a segment according to the BMC algorithm. Ordinary clocks are the most common clock type on a PTP network because they are used as end nodes on a network that is connected to devices requiring synchronization. Ordinary clocks have various interfaces to external devices (end users and applications).

Boundary Clock

This is a multi-port device that can be a master or slave clock. A boundary clock (BC) 6 terminates the upstream PTP connection and initiates a downstream PTP connection. A generalised example of a boundary clock is shown in the blow-up part of FIG. 3. In general deployment, a boundary clock 6 has an internal slave clock 60 that recovers a clock. This clock 60 is then used to drive the internal master 61, which supplies the clock to the next node. Boundary clocks 6 provide an interface between PTP domains. They intercept and process all PTP messages, and pass all other network traffic. The boundary clock 6 uses the BMC algorithm to select the best clock seen by any port. The selected port is then set as a slave. The master port synchronizes the clocks connected downstream, while the slave port synchronizes with the upstream master clock.

Ordinary and boundary clocks configured for the delay request-response mechanism use the following event messages to generate and communicate timing information—Sync, Delay_Req, Follow_Up, Delay_Resp. The delay request-response mechanism is used to measure the path delay between a master and an ordinary or boundary clock. Peer-to-peer transparent clocks (see below) use a similar mechanism called the peer delay mechanism but with different PTP messages.

Transparent Clocks

The processing and buffering of packets in network devices (switches, routers, etc.) introduce variations in the time latency of packets traversing the packet network as illustrated in FIGS. 4 and 5. The variations in these delays means that the assumption that packet delay is the same in each direction is invalid, thus rendering the path delay calculations of PTP inaccurate. This issue can been addressed with the use of boundary clocks and transparent clocks.

A transparent clock (TC) does not act as a master or slave, but instead bridges these two and forwards PTP event messages and provides corrections for the residence time across the bridge. Residence time is the delay between the reception and transmission of a PTP message through a transparent clock device. These delays must be fully accounted for in the slave time offset correction. The role of transparent clocks in a PTP network is to determine certain path delay parameters and update a time-interval field (the correction field) that is part of the PTP event message header. This update allows the terminating clock to compensate for switch delays when synchronizing it clock to the master. The two types of transparent clocks are described below.

End-to-End (E2E) Transparent Clock

This is a multi-port device that is not a master or slave clock but a bridge between the two. This clock measures the message transit time (also known as resident time) in the device for (PTP event) Sync and Delay_Request messages. This measured transit time is added to the correction field in the corresponding messages as follows:

The measured transit time of a Sync message is added to the correction field of the corresponding Sync or the Follow_Up message. In the one-step mode the residence time is added to the correction field of the Sync message; in the twostep mode the residence time is added to the correction field of the Follow_Up message.

The measured transit time of a Delay_Request message is added to the correction field of the corresponding Delay_Response message.

E2E TC devices measure the delay the PTP packet resides in the TC device and increment the correction field in the PTP header as shown in FIG. 6. FIG. 7 shows the flow of PTP messages through an example network of E2E TC devices. The correction field ends up containing the sum of all the residence times that a Sync or Delay_Request message has encountered on its way through all E2E-TC network elements on the path. By doing so, the slave clock or boundary clock further down the line can determine how long the PTP packet resided in the TC devices before it. The slave clock can then use the residence times accumulated in the correction filed to mitigate the effects of PDV. This information is used by the slave when determining the offset between the slave's and the master's time. E2E transparent clocks do not provide correction for the propagation delay of the link itself between devices.

A one-step E2E TC updates for switch delay in Sync and Delay-Req messages as they pass through the switch while a two-step TC updates a field in the non time-critical general message (Follow_Up and Delay_Resp).

The process in FIG. 7 continues hop by hop (where N is the number of hops or links), and the Follow-Up (two-step mode), Sync (one-step mode) or Delay_Req (delay request response mechanism) messages maintain a running total of the residence times; resulting in a grand total delay value from master to slave. Upon receipt of the final message, the slave device calculates its offset using the running total of the residence times which is described by the following formula:

$$\text{total\_residence\_time} = \sum_{i=1}^{N-1} r_i$$

Peer-to-Peer (P2P) Transparent Clock

This is a multi-port device that is not a master or slave clock but a bridge between the two. This clock determines the residence time of a Sync message through the switch. It also determines the inbound path (link) delay as measured using the peer delay mechanism. Both values are added up and placed in the correction field of the Sync message or associated Follow_Up message as illustrated in FIG. 8. A P2P TC forwards and modifies Sync and Follow_Up messages only to compensate for residence time and peer uplink delay. The message exchange of a P2P TC is shown in FIG. 9. A one-step P2P TC updates for switch delay in Sync messages as they pass through the switch while a two-step TC updates a field in the non time-critical general message (Follow_Up).

The upstream link delay is the estimated packet propagation delay between the upstream neighbor P2P TC and the P2P TC under consideration. The correction field of the message received by the slave contains the sum of all residence times and link delays. In theory this is the total end-to-end delay (from master to slave) of the Sync packet. P2P TCs use the following event messages for peer delay measurements: Pdelay_Req, Pdelay_Resp, and Pdelay_Resp Follow_Up. These messages are sent in the sequence shown in FIG. 10.

As the process in FIG. 9 continues hop by hop (where N is the number of hops or links), the Sync or Follow-Up Messages maintain a running total of the residence and propagation times; resulting in a grand total delay value from master to slave. Upon receipt of the final Sync or Follow-Up Message, the slave device calculates its offset using the grand total delay which is described by the following formula:

$$\text{total\_residence\_time\_plus\_propagation\_delay} = \sum_{i=1}^{N-1} r_i + \sum_{i=1}^{N} p_i$$

It is noted here that although the sum of the propagation and residence delays at each transparent clock ($p_1$, $r_1$, $p_2$, $r_2$, ... ) is included in the Sync message's associated Follow-Up's offset correction field, the final propagation delay from transparent clock 2 to the slave device must be included in order to fully capture the end-to-end delay.

Methods for Frequency/Time Transfer

This section reviews the various methods used for frequency/time transfer using a protocol such as IEEE 1588 PTP. We focus on methods that have the capabilities of removing the negative effects that PDV has on the synchronization process.

Transfer Using Boundary Clocks

We consider here the case where all network elements on the path are BCs 6, that is a chain of clocks interconnected by individual PTP connections, one connection per hop, where each clock of the chain is slave of its predecessor and master to its successor. A BC terminates a PTP flow, extracts clock timestamps and recovers the master clock. This arrangement is shown in FIG. 11. The BC then regenerates the PTP flow and clock for downstream nodes. Effectively, the BC has both a slave clock to recover its master clock and also a master clock to regenerate the PTP packets for slave connected to it. The timing packets are generated inside the BC device. Ideally, time/frequency transfer using a BC to BC configuration has no PDV affecting the timing packets received by BC as these have been terminated in a point-to-point (link-by-link) manner. If well implemented, in a chain of BCs, there will be no accumulation of PDV from source to receiver because each timing flow is terminated at a BC and not passed through to the output.

Advantages:

This method provides good synchronization since there are no PDV effects and each node in a synchronization path locks to the upstream node directly and synchronization is traceable to the timing reference.

Note that link-by-link frequency transfer is what is used in legacy TDM networks (PDH and SDH/SONET, and even Synchronous Ethernet (ITUT Recommendation G.8261, G.8262, G.8264). Adapting IEEE 1588 PTP to do the same will move packet-based synchronization closer to that of legacy TDM synchronization which offers high accuracy synchronization services. With this capability packet technologies will offer both the advantages of packet transport and high accuracy synchronization.

Disadvantages:

As each BC recovers the clock and regenerates a new timing signal, this can lead to the introduction of clock wander (low frequency jitter i.e., jitter below 10 Hz). If a chain of BCs are used, like any chain of equipment where the clock is recovered and regenerated in each piece of equipment, then it is expected that there will be some accumulation of wander along the chain in the transferred clock frequency. The chain has to be well designed to minimize wander accumulation.

Special hardware functionality (full PTP master and slave) need to be implemented in each intermediate node involved in the synchronization chain. BCs do not propagate Sync, Follow_Up, Delay_Req, or Delay_Resp messages.

Generally, the advantages far outweigh the disadvantages, since most real life workable synchronization solutions are link-by-link in design. Furthermore, with hardware timestamping this approach offers very high accuracy synchronization and can act as alternative to synchronization solutions such as GPS.

Transfer Using Transparent Clocks

This method involves using the accumulated residence times (in E2E TCs 7) or residence plus total propagation delay (in P2P TCs) at slave to mitigate PDV effects. This configuration is shown in FIG. 12.

The IEEE 1588 does not describe how this should be done but left to vendor/user implementation. The standard does not specify how the clock recovery mechanism at the receiver should be implemented. The technique proposed in this document is one such mechanism for frequency (only) recovery at a slave using the information accumulated in the correction field of the Sync or Follow_Up messages.

Advantages:

When properly calculated, the accumulated residence times (which reflect the PDV experienced by a PTP packet) in the correction field can be used to mitigated PDV effects during clock synchronization at the slave clock.

With proper clock recovery algorithms at the slave, this method has the potential of providing good synchronization traceable to the timing reference at the slave.

Disadvantages:

Special hardware functionality (for residence time calculation and peer-to-peer delay mechanism for P2P TCs) needs to be implemented in each intermediate TC node 7 involved in the synchronization chain. TCs cannot be combined with non-PTP devices in a synchronization path between a master and a slave clock. In addition, all TC devices on a path must be of the same kind (E2E or P2P).

Depending on implementation, the internal queuing structure of the TC device may not allow an accurate calculation and update of the residence time in the correction field of a PTP message (see full discussion later). In some implementations, the queues that the timing packets will pass through before being output from the switch will introduce PDV. When PDV is not completely accounted for in a TC, the residual PDV will propagate to the slave. Hence when a chain of imperfect TCs exist in a network, residual PDV accumulation will occur.

When E2E TCs are used, there can be scalability issues for slaves that implement the path delay mechanism. A master will have to handle all slaves that implement the delay mechanism making scalability a problem if there many slaves. An implementation with P2P TCs is relatively more scalable since the peer delay mechanism involves two adjacent TCs.

Almost all of the above disadvantages related to how the TC is implemented. Ideally this approach offers good synchronization performance if the TCs are properly implemented and good algorithms are used at the slave. The discussion above shows that TCs provide a very powerful way of measuring path delays on a communication path between a master and a slave which can then be used by the slave to mitigate the effects of PDV on the recovered clock.

Packet Pre-Processing (Selection) for Clock Recovery

Another option is to transfer frequency/time in an end-to-end fashion from master to slave without involving the intermediate network nodes 8 as illustrated in FIG. 13. In this case the slave 3 is solely responsible for correctly recovering the master clock signal. Compared to the other methods, clock recovery here is more challenging because the slave 3 is exposed to all the PDV generated by the intermediate packet network 2.

The recovered clock from the PTP timing signal at the slave 3 contains clock noise (contributed largely by PDV) that needs to be removed. A filtering process is used at the slave to filter out the clock noise, thus generating a "smooth" clock output. This process is also often referred to as clock recovery. The clock recovery process in packet networks often involves two major components, a packet pre-processing module 30 and a phase-locked loop (PLL) or servo control mechanism 31 as illustrated in FIG. 14.

Packet Pre-Processing 30: This module in FIG. 14 represents the application of specialized algorithms that are used to mitigate the impact of network-induced PDV.

Phase-Locked Loop 31: This module represents a servo control function that disciplines the local clock 5 to bring its output (frequency or time) into alignment with the master's 4. The servo control function is generally present in all clock recovery mechanisms.

These two mechanisms are used together to attenuate the clock noise introduced by the packet network to levels commensurate with the clock output requirements of the application.

The two modules in FIG. 14 are outside of the scope of the IEEE 1588 standard. The packet pre-processing algorithms and PLL mechanisms are vendor implementation specific and often proprietary. These two mechanisms and the quality of the PLL oscillator 32 represent the two most important factors that determine the performance of a clock. The PLL introduces a low-pass filter characteristic in the path between the master and the slave clock output, and a high-pass filter characteristic between the local oscillator and the clock output (PLL output).

The PLL 31 has low-pass and high-pass characteristics with a common corner frequency. The bandwidth of the loop comprises the frequencies below the corner frequency. The following observations can be made about the filtering characteristics of the PLL 31:

All components of the PDV after packet pre-processing 30 entering the loop and above the corner frequency will be filtered out (attenuated) significantly. All components of the PDV after packet pre-processing 30 below the corner frequency (mostly wander, defined as noise or jitter below 10 Hz) will be passed through to the clock output.

All components of the local PLL oscillator 32 clock noise below the corner frequency will be filtered out. All components of the local oscillator noise above the corner frequency will be passed through to the clock output.

The filtering behavior of the PLL 31 is equivalent to an "averaging" process where the time constant represents the duration over which the averaging is performed. The PLL cut-off frequency and time-constant have a reciprocal relationship and are equivalent descriptors of the low-pass filtering action.

From the above discussion we see that in the absence of packet pre-processing 30, the lowpass filtering action of the PLL 31 is solely responsible for attenuating the entire PDV so that the recovered clock will be compliant with the clock requirements of the application. To achieve this, the low-pass filter of the PLL 31 may have to be designed to have a very small cut-off frequency (meaning PLL has very small bandwidth). The drawback, however, in doing this is that the very low-pass PLL leads to a high-pass characteristic where the loop allows more local oscillator noise to pass through to the clock output. This means that the reduction of the bandwidth of the PLL 31 should not be done arbitrarily, but should take into account the quality of the local oscillator 32. It is for these reasons that applications with more stringent requirements demand higher quality oscillators. A high quality oscillator is stable and generates less noise that passes through to the clock output.

At this point, it should be appreciated that packet pre-processing 30 significantly helps to reduce the clock noise power at the PLL input and thereby can be used to alleviate the requirement of a very high quality (and expensive) oscillator. Efficient pre-processing can allow for the use of less expensive oscillators.

Advantages:

This method offers transparency to the network since timing messages can cross different types of networks (Ethernet, MPLS, Packet of SONET, Frame Relay, etc.). Only end nodes participate in time transfer, thus, method is transparent to the intermediate transport network.

There is no need for special control or processing mechanisms in the intermediate packet network, legacy asynchronous Ethernet devices do not need to be upgraded or retrofitted. No hardware modification necessary in the network equipment.

Disadvantages:

In the general case without packet pre-processing 30, synchronization performance is affected to a great extent by network design and its characteristics: traffic loading, PDV, route changes, etc. The greater the PDV, the more difficult it is to maintain synchronization between master and slave.

The network has to be carefully engineered to provide the PTP messages with the best possible quality of service (no PDV or at best very low PDV depending on end system requirements) in order to achieve high synchronization quality. There are no current guidelines on how this can be done correctly.

Even with packet pre-processing (selection), the quality of the recovered clock at the slave will depend on how well the packet selection algorithm screens out the PDV in the arriving PTP messages.

Comments on Frequency Synchronization (Syntonization) of Transparent Clock to Master Considering the case where a TC contains a free-running oscillator with frequency accuracy no worse than ±100 ppm. If residence time is measured using this oscillator, there will be an error on the order of the residence time multiplied by the actual frequency offset. Optimum synchronization performance is obtained when all TCs on a synchronization path are frequency locked (syntonized) to the master clock. If a TC is not frequency synchronized to the GM, a TC with a ±100 ppm accuracy will contribute a measurement error of 40.0001×10 ms)=±1 µs (or ±1000 ns) to the residence time if the ideal residence time is 10 ms. A good thing is that oscillator do not typically operate at the extreme ends of their accuracy limits.

To reduce this error, IEEE 1588 Version 2 allows the TC to be syntonized, i.e., synchronized in frequency, to the GM. Each TC will use its own internal mechanisms to measure frequency offset relative to the GM and to synthesize a frequency signal that is syntonized with the GM. This synthesis may be done via hardware, firmware, or software.

In the case of a network with nodes having standard Ethernet oscillators, with nominal rates of 25 MHz for 100 Mbit/s Ethernet and 125 MHz for 1 Gbit/s Ethernet, this means that the phase measurement granularity in the TC and OC can be as much as 40 ns.

Additional phase error will result from the variable component of latency in the Ethernet physical layer (PHY) (the fixed component can be specified by the manufacturer in the design).

Now, looking at the case of a syntonized TC local oscillator. If the frequency offset between the GM and TC oscillator is measured and a syntonized frequency is created, the use of this frequency for the TC delay computation will greatly reduce the magnitude of the TC measurement errors. The phase step magnitude will now be on the order of the syntonized frequency measurement accuracy multiplied by the synch interval. For example, if the phase measurement granularity is 40 ns (assuming a 25 MHz oscillator for 100 Mbit/s Ethernet) and the TC oscillator frequency offset is measured/syntonized over 100 ms, then the measured frequency offset is $40 \times 10^{-9}$ s/0.1 s=$400 \times 10^{-9}$=0.4 ppm (parts-per-million). The TC measurement error or offset now is $(400 \times 10^{-9})(0.01$ s)=4 ns, i.e., the TC measurement error is reduced from the 1000 ns computed when the free-running local oscillator is used for the measurement by a factor of 250. In practice, the reduction will not be this large because other effects are present, e.g., oscillator phase noise and drifts due to temperature effects, phase measurement error due to the variable portion of the PHY latency, and frequency measurement granularity.

Thus, to conclude, the timing options available for TC for delay measurements are:

Both E2E and P2P TCs: A TC uses a local free-running oscillator embedded in the TC Both E2E and P2P TCs: A TC uses a signal that is syntonized to the GM P2P TCs Only: A TC uses a signal that is time synchronized to the GM. The TC computes a time offset which it uses to align its clock.

For most accurate residence time measurements, the PTP clocks in each TC should be syntonized with the GM. Syntonization only requires correction to the TC oscillator frequency. The TC host processor can use the ingress timestamps from Sync messages to determine a frequency (rate) correction required for the PTP clock. Alternatively, syntonization may be handled on the TC host processor without adjusting the frequency of the TC clocks. The frequency correction may be used to modify the computed residence times inserted into Follow_Up and Delay_Resp messages. This method may not be used with one-step operation.

SUMMARY OF THE INVENTION

An exemplary embodiment of the invention provides a method of synchronising the frequency of an oscillator in a slave device to the frequency of a master clock in a master device, the method including the steps of:

a) receiving in the slave device a first message from said master device having a first time-stamp which is a time-stamp of said master clock indicating the precise time of sending of said first message and a first correction value which is the cumulative delay encountered by the message during its passage from the master device to the slave device;

b) extracting said time-stamp and said correction value from said first message and recording a first value of a counter in the slave device at the time of receipt of the first message;

c) receiving in the slave device a further message from said master device having a second time stamp which is a time-stamp of said master clock indicating the precise time of sending of said further message and a second correction value which is the cumulative delay encountered by the message during its passage from the master device to the slave device;

d) extracting said time-stamp and said correction value from said further message and recording a further value of the counter in the slave device at the time of receipt of the further message;

e) determining an error signal which is representative of the difference between the first and further time-stamps and the first and further values of the counter, adjusted by the difference between the first and further correction values; and f) adjusting the frequency of the oscillator based on said error signal.

A further exemplary embodiment of the invention provide a method of synchronising the frequency of an oscillator in a slave device to the frequency of a master clock in a master device, the method including the steps of:

a) receiving in the slave device a first message from said master device and recording a first value of a counter in the slave device at the time of receipt of the first message;

b) receiving in the slave device a second message from said master device, the second message having a first time-stamp which is a time-stamp of said master clock indicating the precise time of sending of said first message and a first correction value which is the cumulative delay encountered by the second message during its passage from the master device to the slave device c) extracting said time-stamp and said correction value from said second message;

d) receiving in the slave device a first further message from said master device and recording a further value of the counter in the slave device at the time of receipt of the further message;

e) receiving in the slave device a second further message from said master device, the second further message having a second time stamp which is a time-stamp of said master clock indicating the precise time of sending of said first further message and a second correction value which is the cumulative delay encountered by the second further message during its passage from the master device to the slave device;

f) extracting said time-stamp and said correction value from said second further message;

g) determining an error signal which is representative of the difference between the first and further time-stamps and the first and further values of the counter, adjusted by the difference between the first and further correction values; and h) adjusting the frequency of the oscillator based on said error signal.

A further exemplary embodiment of the invention provides an apparatus for synchronizing the frequency of a slave clock in a slave device which is communicatively coupled to a master device having a master clock, the slave clock comprising: an oscillator; and a pulse counter counting pulses from said oscillator; the apparatus comprising: a receiver receiving messages from said master device; a time-stamp extraction device for extracting time-stamps applied to said messages by the master device; a correction field extraction device for extracting values from a correction field contained in said messages; and a phase detector, wherein: the receiver receives a first message from said master device having a first time-stamp which is a time-stamp of said master clock indicating the precise time of sending of said first message and a first correction value which is the cumulative delay encountered by the message during its passage from the master device to the slave device and records a first value of the counter at the time of receipt of the first message; the time-stamp extraction device extracts said time-stamp from said first message; the correction field extraction device extracts said correction value from said first message; the receiver receives a further message from said master device having a second time stamp which is a time-stamp of said master clock indicating the precise time of sending of said further message and a second correction value which is the cumulative delay encountered by the message during its passage from the master device to the slave device and records a further value of the counter in the slave device at the time of receipt of the further message; the time-stamp extraction device extracts said time-stamp from said further message; the correction field extraction device extracts said correction value from said further message; the detector determines an error signal which is representative of the difference between the first and further time-stamps and the first and further values of the counter, adjusted by the difference between the first and further correction values; and said oscillator adjusts its frequency of oscillation based on said error signal.

A further exemplary embodiment of the invention provides an apparatus for synchronizing the frequency of a slave clock in a slave device which is communicatively coupled to a master device having a master clock, the slave clock comprising: an oscillator; and a pulse counter counting pulses from said oscillator; the apparatus comprising: a receiver receiving messages from said master device; a time-stamp extraction device for extracting time-stamps applied to said messages by the master device; a correction field extraction device for extracting values from a correction field contained in said messages; and a phase detector, wherein: the receiver receives a first message from said master device and records a first value of the counter at the time of receipt of the first message; the receiver receives a second message from said master device, the second message having a first time-stamp which is a time-stamp of said master clock indicating the precise time of sending of said first message and a first correction value which is the cumulative delay encountered by the second message during its passage from the master device to the slave device; the time-stamp extraction device extracts said time-stamp from said second message; the correction field extraction device extracts said correction value from said second message; the receiver receives a further message from said master device and records a further value of the counter in the slave device at the time of receipt of the further message; the receiver receives a second further message from said master device, the second further message having a second time stamp which is a time-stamp of said master clock indicating the precise time of sending of said first further message and a second correction value which is the cumulative delay encountered by the second further message during its passage from the master device to the slave device; the time-stamp extraction device extracts said time-stamp from said second further message; the correction field extraction device extracts said correction value from said second further message; the detector determines an error signal which is representative of the difference between the first and further time-stamps and the first and further values of the counter, adjusted by the difference between the first and further correction values; and said oscillator adjusts its frequency of oscillation based on said error signal.

A further exemplary embodiment of the invention provides a frequency synchronisation system for a packet network, the system including: a master device having a master clock; a slave device having a slave clock; and a packet network connecting the master and slave devices, wherein: the slave clock comprises: an oscillator; and a pulse counter counting pulses from said oscillator; the slave device comprises a frequency synchronization apparatus comprising: a receiver receiving messages from said master device; a time-stamp extraction device for extracting time-stamps applied to said messages by the master device; a correction field extraction device for extracting values from a correction field contained in said messages; and a phase detector, wherein: the receiver receives a first message from said master device having a first time-stamp which is a time-stamp of said master clock indicating the precise time of sending of said first message and a first correction value which is the cumulative delay encountered by the message during its passage from the master device to the slave device and records a first value of the counter at the time of receipt of the first message; the time-stamp extraction device extracts said time-stamp from said first message; the correction field extraction device extracts said correction value from said first message; the receiver receives a further message from said master device having a second time stamp which is a time-stamp of said master clock indicating the precise time of sending of said further message and a second correction value which is the cumulative delay encountered by the message during its passage from the master device to the slave device and records a further value of the counter in the slave device at the time of receipt of the further message; the time-stamp extraction device extracts said time-stamp from said further message; the correction field extraction device extracts said correction value from said further message; the detector determines an error signal which is representative of the difference between the first and further time-stamps and the first and further values of the counter, adjusted by the difference between the first and further correction values; and said oscillator adjusts its frequency of oscillation based on said error signal.

A further exemplary embodiment of the invention provides a frequency synchronisation system for a packet network, the system including: a master device having a master clock; a slave device having a slave clock; and a packet network connecting the master and slave devices, wherein: the slave clock comprises: an oscillator; and a pulse counter counting pulses from said oscillator; the slave device comprises a frequency synchronization apparatus comprising: the apparatus comprising: a receiver receiving messages from said master device; a time-stamp extraction device for extracting time-stamps applied to said messages by the master device; a correction field extraction device for extracting values from a correction field contained in said messages; and a phase detector, wherein: the receiver receives a first message from said master device and records a first value of the counter at the time of receipt of the first message; the receiver receives a second message from said master device, the second message having a first time-stamp which is a time-stamp of said master clock indicating the precise time of sending of said first message and a first correction value which is the cumulative delay encountered by the second message during its passage from the master device to the slave device; the time-stamp extraction device extracts said time-stamp from said second message; the correction field extraction device extracts said correction value from said second message; the receiver receives a further message from said master device and records a further value of the counter in the slave device at the time of receipt of the further message; the receiver receives a second further message from said master device, the second further message having a second time stamp which is a time-stamp of said master clock indicating the precise time of sending of said first further message and a second correction value which is the cumulative delay encountered by the second further message during its passage from the master device to the slave device; the time-stamp extraction device extracts said time-stamp from said second further message; the correction field extraction device extracts said correction value from said second further message; the detector determines an error signal which is representative of the difference between the first and further time-stamps and the first and further values of the counter, adjusted by the difference between the first and further correction values; and said oscillator adjusts its frequency of oscillation based on said error signal.

BRIEF DESCRIPTION OF THE DRAWINGS

Embodiments of the invention will now be described by way of example with reference to the accompanying drawings in which.

DETAILED DESCRIPTION

Figure 1:
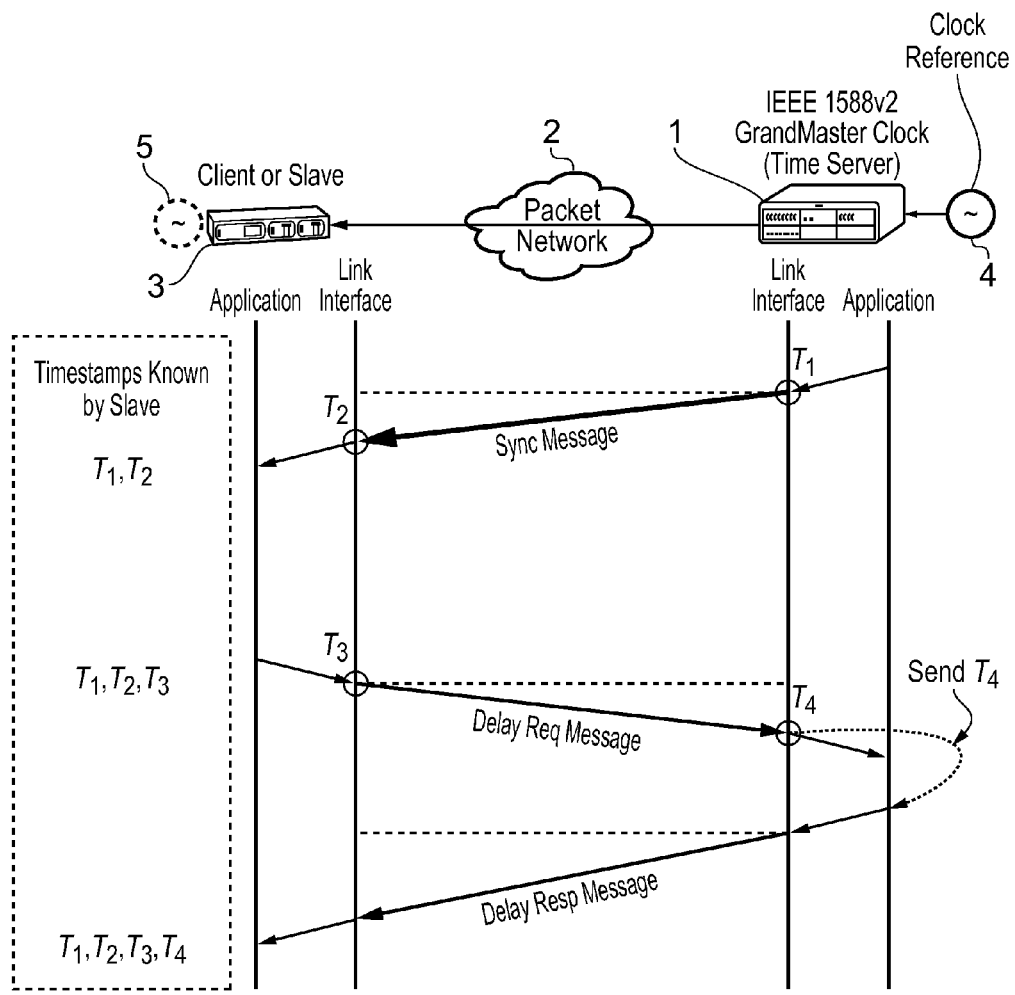
FIG. 1 shows the sequence of messages in a one-step clock synchronisation method under IEEE 1588 PTP and has already been described.

Accordingly, at their broadest, methods of the present invention provide for synchronising the frequency of an oscillator in a slave device to the frequency of a master clock in a master device by taking account of delay variations to messages between them.

A first aspect of the present invention provides a method of synchronising the frequency of an oscillator in a slave device to the frequency of a master clock in a master device, the method including the steps of:

a) receiving in the slave device a first message from said master device having a first time-stamp which is a time-stamp of said master clock indicating the precise time of sending of said first message and a first correction value which is the cumulative delay encountered by the message during its passage from the master device to the slave device;

b) extracting said time-stamp and said correction value from said first message and recording a first value of a counter in the slave device at the time of receipt of the first message;

c) receiving in the slave device a further message from said master device having a second time stamp which is a time-stamp of said master clock indicating the precise time of sending of said further message and a second correction value which is the cumulative delay encountered by the message during its passage from the master device to the slave device;

d) extracting said time-stamp and said correction value from said further message and recording a further value of the counter in the slave device at the time of receipt of the further message;

e) determining an error signal which is representative of the difference between the first and further time-stamps and the first and further values of the counter, adjusted by the difference between the first and further correction values; and f) adjusting the frequency of the oscillator based on said error signal.

The method of this aspect is applicable in a one-step clock synchronisation situation in which messages from the master are time-stamped with the time of their own transmission, for example by hardware time-stamping.

Packet delay variation (PDV) is a direct contributor to the noise in the recovered clock and the method of this aspect aims to mitigate its effects and enable the slave clock to recover the master clock to a higher quality. The method of this aspect may allow recovery of the master clock as if the communication path between the master and the slave is free of PDV.

In such circumstances, the master and slave may be connected via a packet network and the network can provide clock synchronization services to the same level as time division multiplexing (TDM) networks and Global Positioning System (GPS).

By using the method of the present aspect, it may be possible to directly measure and remove PDV effects in the clock recovery mechanism at the slave. Preferably the clock recovery mechanism is a phase-locked loop (PLL) with a PDV compensation feature built-in. The resulting effect is that the slave is able to recover the master clock to a higher quality as if the communication path between master and slave is free of PDV. A communication path free of artifacts such as PDV offers the best channel for clock transfer.

Preferably the method includes the step of filtering the error signal prior to adjusting the frequency. Even with the method of the present invention, it is likely that there will be some residual delays (e.g. residual PDV resulting from the accuracy of the correction values stored in the messages). These residual delays create residual "noise" which can be reduced by filtering the error signal before it is used to adjust the frequency. Filtering can also mitigate the effects of incoming clock wander and jitter and local clock noise.

Preferably the correction value is the accumulated residence times in the network devices through which the messages pass between the master device and the slave device. This means that the delay attributable to the presence of such network devices can be accounted for and their effects can be removed from the synchronisation algorithm.

In one embodiment of this aspect, the messages are PTP Sync messages and the correction value is stored in the correction field of the PTP messages. This embodiment is particularly suitable for use where the network devices through which the messages pass between the master device and the slave device are end-to-end transparent clocks, which record the residence times in the correction field of the PTP messages.

In another embodiment of this aspect, the messages are PTP Sync messages and the correction value is stored in a type, length, value field which is an extension to those messages. This embodiment is particularly suitable for use where the network devices through which the messages pass between the master device and the slave device are peer-to-peer transparent clocks. Such devices use the existing correction field in the PTP messages to record the residence times in those devices as well as the link propagation delays. Therefore it is preferable in this arrangement that a separate type, length, value field is defined in the messages to record the residence time alone which can then be used in the calculation of the error signal.

Preferably the method is a continuous method which repeats steps c) to f), more preferably doing so at all times when the slave device is operational so that the slave clock is maintained in frequency synchronisation with the master clock.

It should be noted here that scalability is not an issue in this method since it uses only unidirectional messaging (e.g. Sync and Follow_Up messages) from the master to the slave(s) and no delay mechanism or peer delay mechanism is required.

The method of the present aspect may include any combination of some, all or none of the above described preferred and optional features.

A second aspect of the present invention provides a method of synchronising the frequency of an oscillator in a slave device to the frequency of a master clock in a master device, the method including the steps of:

a) receiving in the slave device a first message from said master device and recording a first value of a counter in the slave device at the time of receipt of the first message;

b) receiving in the slave device a second message from said master device, the second message having a first time-stamp which is a time-stamp of said master clock indicating the precise time of sending of said first message and a first correction value which is the cumulative delay encountered by the second message during its passage from the master device to the slave device c) extracting said time-stamp and said correction value from said second message;

d) receiving in the slave device a first further message from said master device and recording a further value of the counter in the slave device at the time of receipt of the further message;

e) receiving in the slave device a second further message from said master device, the second further message having a second time stamp which is a time-stamp of said master clock indicating the precise time of sending of said first further message and a second correction value which is the cumulative delay encountered by the second further message during its passage from the master device to the slave device;

f) extracting said time-stamp and said correction value from said second further message;

g) determining an error signal which is representative of the difference between the first and further time-stamps and the first and further values of the counter, adjusted by the difference between the first and further correction values; and h) adjusting the frequency of the oscillator based on said error signal.

The method of this aspect is similar to that of the above described first aspect, except that it relates to a two-step clock synchronisation situation in which the time-stamp indicating the time of dispatch of a message and the correction values are sent in a subsequent message.

The optional and preferred features described above in conjunction with the first aspect are equally applicable to the apparatus of this aspect and some, all or none of these features may be present in combination in modifications of this second aspect.

However, due to the two-step synchronisation, in a preferred implementation, the second and second further messages are PTP Follow_Up messages and the correction values are stored in those messages in the manner set out in relation to the PTP Sync messages in relation to the first aspect above (the first and first further messages may correspondingly be PTP Sync messages as for the first aspect above).

Similarly, whereas for continuous operation of the method according to the above first aspect, steps c) to f) of that aspect are repeated, in preferred arrangements of the second aspect, steps d) to h) are repeated, more preferably continuously.

The method of the present aspect may include any combination of some, all or none of the above described preferred and optional features.

The methods of the above aspects are preferably implemented in an apparatus according to the third or fourth aspects of this invention, or a system according to the fifth or sixth aspects of this invention, as described below, but need not be.

Further aspects of the present invention include computer for running on computer systems which carry out the methods of the above aspects, including some, all or none of the preferred and optional features of those aspects.

At their broadest, apparatuses of the present invention synchronise the frequency of an oscillator in a slave device to the frequency of a master clock in a master device by taking account of delay variations to messages between them.

A third aspect of the present invention provides an apparatus for synchronizing the frequency of a slave clock in a slave device which is communicatively coupled to a master device having a master clock, the slave clock comprising: an oscillator; and a pulse counter counting pulses from said oscillator; the apparatus comprising: a receiver receiving messages from said master device; a time-stamp extraction device for extracting time-stamps applied to said messages by the master device; a correction field extraction device for extracting values from a correction field contained in said messages; and a phase detector, wherein: the receiver receives a first message from said master device having a first time-stamp which is a time-stamp of said master clock indicating the precise time of sending of said first message and a first correction value which is the cumulative delay encountered by the message during its passage from the master device to the slave device and records a first value of the counter at the time of receipt of the first message; the time-stamp extraction device extracts said time-stamp from said first message; the correction field extraction device extracts said correction value from said first message; the receiver receives a further message from said master device having a second time stamp which is a time-stamp of said master clock indicating the precise time of sending of said further message and a second correction value which is the cumulative delay encountered by the message during its passage from the master device to the slave device and records a further value of the counter in the slave device at the time of receipt of the further message; the time-stamp extraction device extracts said time-stamp from said further message; the correction field extraction device extracts said correction value from said further message; the detector determines an error signal which is representative of the difference between the first and further time-stamps and the first and further values of the counter, adjusted by the difference between the first and further correction values; and said oscillator adjusts its frequency of oscillation based on said error signal.

Packet delay variation (PDV) is a direct contributor to the noise in the recovered clock and the apparatus of this aspect aims to mitigate its effects and enable the slave clock to recover the master clock to a higher quality. The apparatus of this aspect may allow recovery of the master clock as if the communication path between the master and the slave is free of PDV.

In such circumstances, the master and slave may be connected via a packet network and the network can provide clock synchronization services to the same level as time division multiplexing (TDM) networks and Global Positioning System (GPS).

Preferably the apparatus further includes a filter which filters the error signal from said detector to form a control signal and wherein the oscillator adjust its frequency of oscillation based on said control signal.

Even with the synchronisation apparatus of the present aspect, it is likely that there will be some residual delays (e.g. residual PDV resulting from the accuracy of the correction values stored in the messages). These residual delays create residual "noise" which can be reduced by filtering the error signal before it is used to adjust the frequency. Filtering can also mitigate the effects of incoming clock wander and jitter and local clock noise.

By using the apparatus of the present aspect, it may be possible for the slave device to directly measure and remove PDV effects in its clock recovery mechanism. Preferably the clock recovery mechanism is a phase-locked loop (PLL) formed by the oscillator, counter, detector and filter with PDV compensation built-in. The resulting effect is that the slave is able to recover the master clock to a higher quality as if the communication path between master and slave is free of PDV. A communication path free of artifacts such as PDV offers the best channel for clock transfer.

Preferably the correction value is the accumulated residence times in the network devices through which the messages pass between the master device and the slave device. This means that the delay attributable to the presence of such network devices can be accounted for and their effects can be removed from the synchronisation algorithm.

In one embodiment of this aspect, the messages are PTP Sync messages and the correction value is stored in the correction field of the PTP messages. This embodiment is particularly suitable for use where the network devices through which the messages pass between the master device and the slave device are end-to-end transparent clocks, which record the residence times in the correction field of the PTP messages.

In another embodiment of this aspect, the messages are PTP Sync messages and the correction value is stored in a type, length, value field which is an extension to those messages. This embodiment is particularly suitable for use where the network devices through which the messages pass between the master device and the slave device are peer-to-peer transparent clocks. Such devices use the existing correction field in the PTP messages to record the residence times in those devices as well as the link propagation delays. Therefore it is preferable in this arrangement that a separate type, length, value field is defined in the messages to record the residence time alone which can then be used in the calculation of the error signal.

It should be noted here that scalability is not an issue in this apparatus since it uses only unidirectional messaging (e.g. Sync and Follow_Up messages) from the master to the slave(s) and no delay mechanism or peer delay mechanism is required.

The apparatus of this aspect preferably operates by carrying out a method according to the above described first aspect.

The apparatus of the present aspect may include any combination of some, all or none of the above described preferred and optional features.

A fourth aspect of the present invention provides an apparatus for synchronizing the frequency of a slave clock in a slave device which is communicatively coupled to a master device having a master clock, the slave clock comprising: an oscillator; and a pulse counter counting pulses from said oscillator; the apparatus comprising: a receiver receiving messages from said master device; a time-stamp extraction device for extracting time-stamps applied to said messages by the master device; a correction field extraction device for extracting values from a correction field contained in said messages; and a phase detector, wherein: the receiver receives a first message from said master device and records a first value of the counter at the time of receipt of the first message; the receiver receives a second message from said master device, the second message having a first time-stamp which is a time-stamp of said master clock indicating the precise time of sending of said first message and a first correction value which is the cumulative delay encountered by the second message during its passage from the master device to the slave device; the time-stamp extraction device extracts said time-stamp from said second message; the correction field extraction device extracts said correction value from said second message; the receiver receives a further message from said master device and records a further value of the counter in the slave device at the time of receipt of the further message; the receiver receives a second further message from said master device, the second further message having a second time stamp which is a time-stamp of said master clock indicating the precise time of sending of said first further message and a second correction value which is the cumulative delay encountered by the second further message during its passage from the master device to the slave device; the time-stamp extraction device extracts said time-stamp from said second further message; the correction field extraction device extracts said correction value from said second further message; the detector determines an error signal which is representative of the difference between the first and further time-stamps and the first and further values of the counter, adjusted by the difference between the first and further correction values; and said oscillator adjusts its frequency of oscillation based on said error signal.

The apparatus of this aspect is similar to that of the above described third aspect, except that it relates to a two-step clock synchronisation situation in which the time-stamp indicating the time of dispatch of a message and the correction values are sent in a subsequent message. The optional and preferred features described above in conjunction with the third aspect are equally applicable to the apparatus of this aspect and some, all or none of these features may be present in combination in modifications of this fourth aspect.

However, due to the two-step synchronisation, in a preferred implementation, the second and second further messages are PTP Follow_Up messages and the correction values are stored in those Follow_Up messages in the manner set out for the PTP Sync messages in relation to the third aspect above (the first and first further messages may correspondingly be PTP Sync messages as for the third aspect above).

The apparatus of this aspect preferably operates by carrying out a method according to the above second aspect.

The apparatus of the present aspect may include any combination of some, all or none of the above described preferred and optional features.

At their broadest, systems of the present invention provide for frequency synchronisation in a packet network by taking account of delay variations to messages between a master device and a slave device.

A fifth aspect of the present invention provides a frequency synchronisation system for a packet network, the system including: a master device having a master clock; a slave device having a slave clock; and a packet network connecting the master and slave devices, wherein: the slave clock comprises: an oscillator; and a pulse counter counting pulses from said oscillator; the slave device comprises a frequency synchronization apparatus comprising: a receiver receiving messages from said master device; a time-stamp extraction device for extracting time-stamps applied to said messages by the master device; a correction field extraction device for extracting values from a correction field contained in said messages; and a phase detector, wherein: the receiver receives a first message from said master device having a first time-stamp which is a time-stamp of said master clock indicating the precise time of sending of said first message and a first correction value which is the cumulative delay encountered by the message during its passage from the master device to the slave device and records a first value of the counter at the time of receipt of the first message; the time-stamp extraction device extracts said time-stamp from said first message; the correction field extraction device extracts said correction value from said first message; the receiver receives a further message from said master device having a second time stamp which is a time-stamp of said master clock indicating the precise time of sending of said further message and a second correction value which is the cumulative delay encountered by the message during its passage from the master device to the slave device and records a further value of the counter in the slave device at the time of receipt of the further message; the time-stamp extraction device extracts said time-stamp from said further message; the correction field extraction device extracts said correction value from said further message; the detector determines an error signal which is representative of the difference between the first and further time-stamps and the first and further values of the counter, adjusted by the difference between the first and further correction values; and said oscillator adjusts its frequency of oscillation based on said error signal.

Packet delay variation (PDV) is a direct contributor to the noise in the recovered clock and the apparatus of this aspect aims to mitigate its effects and enable the slave clock to recover the master clock to a higher quality. The system of this aspect aims to provide for recovery of the master clock as if the communication path between the master and the slave is free of PDV.

In such circumstances, despite the master and slave being connected via a packet network, the network can provide clock synchronization services to the same level as time division multiplexing (TDM) networks and Global Positioning System (GPS).

Preferably the frequency synchronisation apparatus further includes a filter which filters the error signal from said detector to form a control signal and wherein the oscillator adjust its frequency of oscillation based on said control signal.

Even with the system of the present aspect, it is likely that there will be some residual delays (e.g. residual PDV resulting from the accuracy of the correction values stored in the messages) in messages received by the slave device. These residual delays create residual "noise" which can be reduced by filtering the error signal before it is used to adjust the frequency. Filtering can also mitigate the effects of incoming clock wander and jitter and local clock noise.

By using the system of the present aspect, it may be possible for the slave device to directly measure and remove PDV effects in its clock recovery mechanism. Preferably the clock recovery mechanism is a phase-locked loop (PLL) formed by the oscillator, counter, detector and filter with PDV compensation built-in. The resulting effect is that the slave is able to recover the master clock to a higher quality as if the communication path between master and slave is free of PDV. A communication path free of artifacts such as PDV offers the best channel for clock transfer.

The system can, of course, include multiple slave devices of the type set out, all of which have slave clocks which are synchronised to the master clock.

Preferably the correction value is the accumulated residence times in the network devices through which the messages pass between the master device and the slave device. This means that the delay attributable to the presence of such network devices can be accounted for and their effects can be removed from the synchronisation algorithm.

Preferably, the system further includes at least one further device connected to the packet network between the master and slave devices, wherein the further device is a transparent clock which forwards said messages and updates the correction field in the forwarded messages to account for the residence time of each message in the device.

In one embodiment of this aspect, the messages are PTP Sync messages and the further device is an end-to-end transparent clock which measures the transit time in the device and adds that time to the correction field of each Sync message that passes through the device. The end-to-end transparent clocks record the residence times in the correction field of the PTP messages which can then be used for compensation of the error signal.

In another embodiment of this aspect, the messages are PTP Sync messages and the further device is a peer-to-peer transparent clock which measures the transit time in the device and adds that time to a type, length, value extension field defined in the Sync messages for that purpose. The peer-to-peer transparent clocks use the existing correction field in the PTP messages to record the residence times in those devices as well as the link propagation delays. Therefore it is preferable in this arrangement that a separate type, length, value field is defined in the messages to record the residence time alone which can then be used in the calculation of the error signal.

It should be noted here that scalability is not an issue in this apparatus since it uses only unidirectional messaging (e.g. Sync and Follow_Up messages) from the master to the slave(s) and no delay mechanism or peer delay mechanism is required.

The system of this aspect preferably operates by carrying out a method according to the above described first aspect.

The system of the present aspect may include any combination of some, all or none of the above described preferred and optional features.

A sixth aspect of the present invention provides a frequency synchronisation system for a packet network, the system including: a master device having a master clock; a slave device having a slave clock; and a packet network connecting the master and slave devices, wherein: the slave clock comprises: an oscillator; and a pulse counter counting pulses from said oscillator; the slave device comprises a frequency synchronization apparatus comprising: the apparatus comprising: a receiver receiving messages from said master device; a time-stamp extraction device for extracting time-stamps applied to said messages by the master device; a correction field extraction device for extracting values from a correction field contained in said messages; and a phase detector, wherein: the receiver receives a first message from said master device and records a first value of the counter at the time of receipt of the first message; the receiver receives a second message from said master device, the second message having a first time-stamp which is a time-stamp of said master clock indicating the precise time of sending of said first message and a first correction value which is the cumulative delay encountered by the second message during its passage from the master device to the slave device; the time-stamp extraction device extracts said time-stamp from said second message; the correction field extraction device extracts said correction value from said second message; the receiver receives a further message from said master device and records a further value of the counter in the slave device at the time of receipt of the further message; the receiver receives a second further message from said master device, the second further message having a second time stamp which is a time-stamp of said master clock indicating the precise time of sending of said first further message and a second correction value which is the cumulative delay encountered by the second further message during its passage from the master device to the slave device; the time-stamp extraction device extracts said time-stamp from said second further message; the correction field extraction device extracts said correction value from said second further message; the detector determines an error signal which is representative of the difference between the first and further time-stamps and the first and further values of the counter, adjusted by the difference between the first and further correction values; and said oscillator adjusts its frequency of oscillation based on said error signal.

The system of this aspect is similar to that of the above described fifth aspect, except that it relates to a two-step clock synchronisation situation in which the time-stamp indicating the time of dispatch of a message and the correction values are sent in a subsequent message. The optional and preferred features described above in conjunction with the fifth aspect are equally applicable to the apparatus of this aspect and some, all or none of these features may be present in combination in modifications of this sixth aspect.

However, due to the two-step synchronisation, in one embodiment of this aspect, the second message and second further message are PTP Follow_Up messages and the further device is an end-to-end transparent clock which measures the transit time in the device and adds that time to the correction field of each Follow_Up message that passes through the device. The end-to-end transparent clocks record the residence times in the correction field of the PTP messages which can then be used for compensation of the error signal.

Correspondingly, in another embodiment of this aspect, the messages are PTP Follow_Up messages and the further device is a peer-to-peer transparent clock which measures the transit time in the device and adds that time to a type, length, value extension field defined in the Follow_Up messages for that purpose. The peer-to-peer transparent clocks use the existing correction field in the PTP messages to record the residence times in those devices as well as the link propagation delays. Therefore it is preferable in this arrangement that a separate type, length, value field is defined in the messages to record the residence time alone which can then be used in the calculation of the error signal.

The system of this aspect preferably operates by carrying out a method according to the above second aspect.

The system of the present aspect may include any combination of some, all or none of the above described preferred and optional features.

In the embodiments below, a clock recovery mechanism (a PLL) that has a PDV mitigation mechanism built into it is described in which the PDV measurements are provided by intermediate network elements with TCs.

From the discussion above on transparent clocks, we see that a transparent clock modifies and forwards PTP messages to the slave for it to compensate for residence times when adjusting its clock. Compensation is achieved by addition of the switch (or transparent clock device) residence time into a correction field within the header of the message. This allows the slave clock to remove the delay experienced in the transparent clock device.

Figure 2:
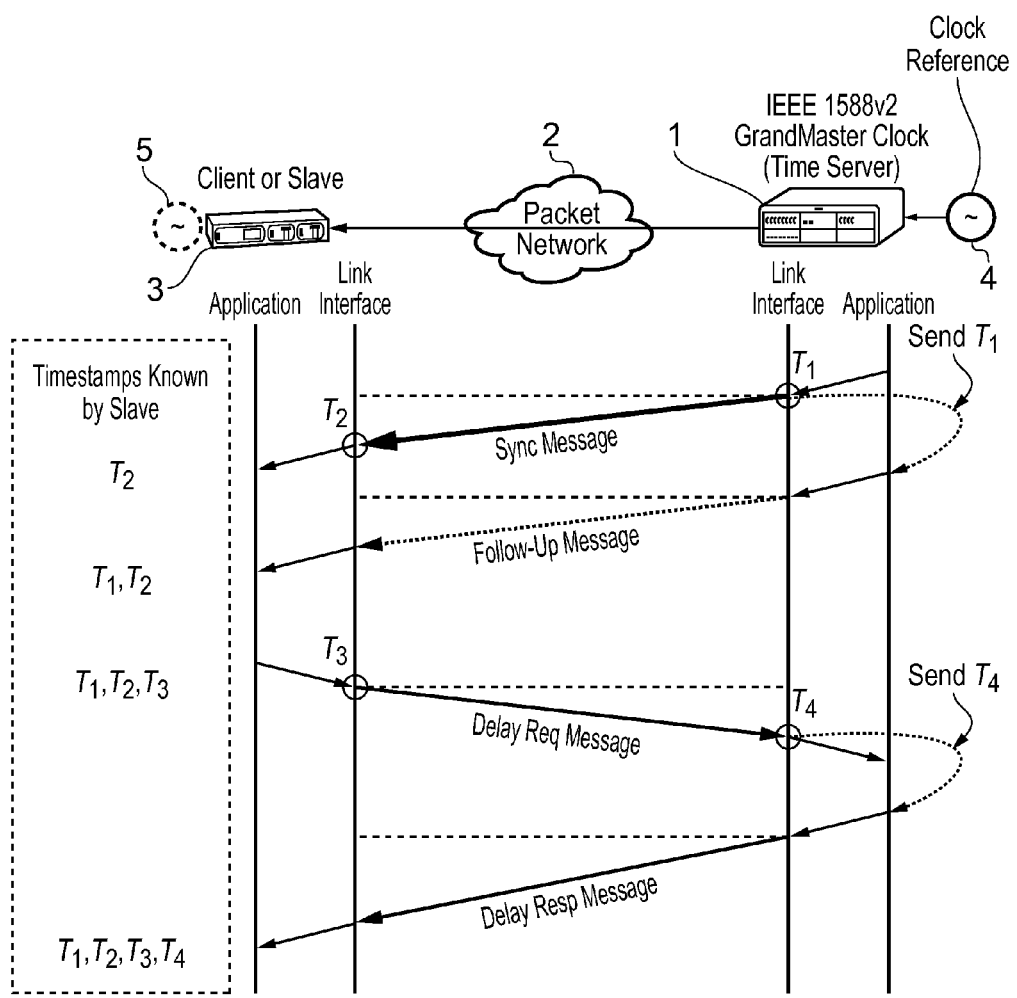
FIG. 2 shows the sequence of messages in a two-step clock synchronisation method under IEEE 1588 PTP and has already been described.
Figure 3:
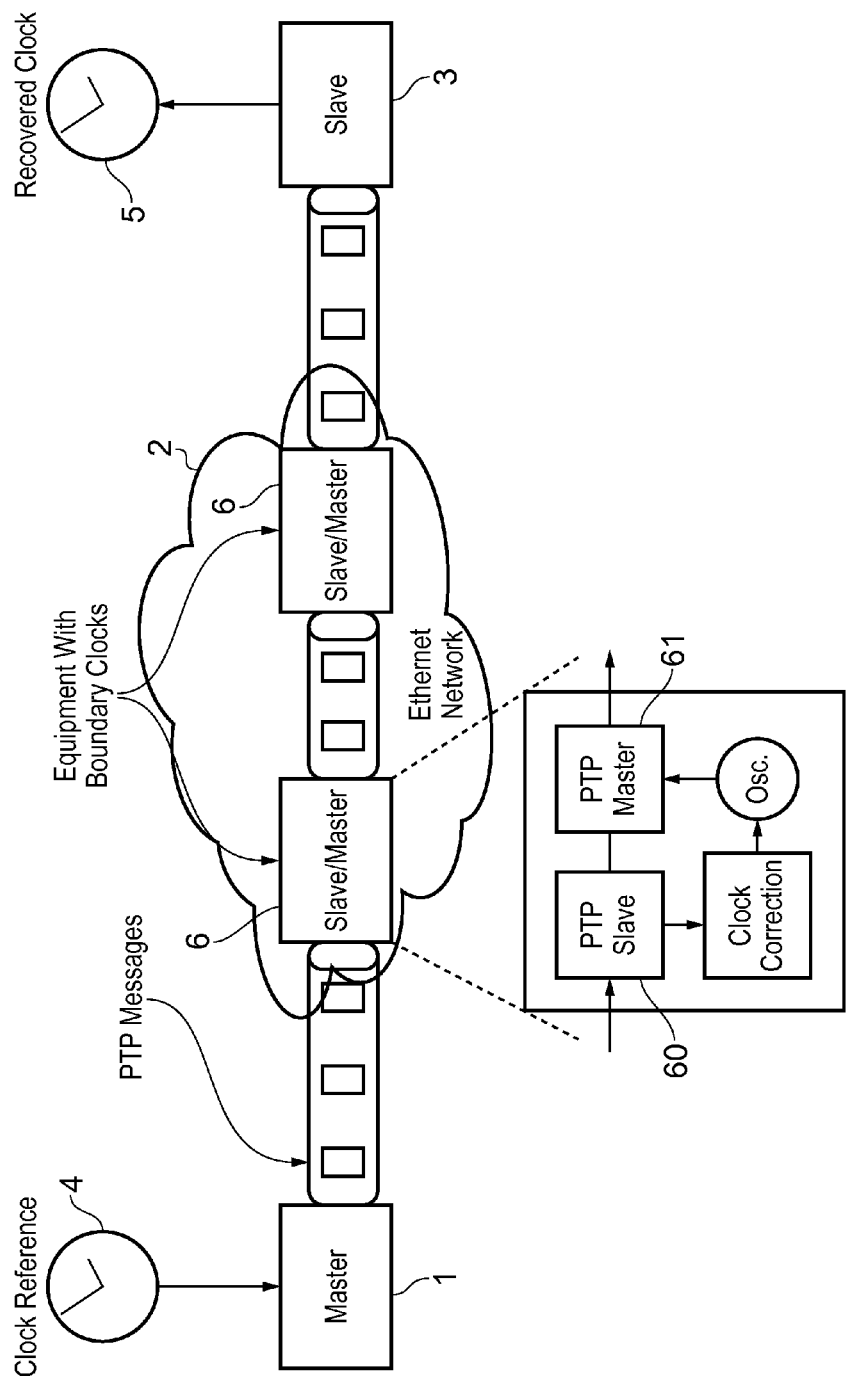
FIG. 3 shows a configuration of devices under IEEE 1588 using boundary clocks and has already been described.

In the following embodiments of the invention only frequency synchronization (i.e., syntonization) is considered, thus making only Sync messages (one-step clock mode) and Follow_Up messages (two-step clock mode) essential to the frequency synchronization algorithm. The full message exchange as described above and illustrated in FIG. 1 and FIG. 2 is not required.

Both the master and the slave have their own time bases which are driven by the internal clocks that both sides use in the transmission and reception of data. The slave synchronizes its time base to that of the master which is assumed to operate with frequency $f_s = 1/\tau_s$ Hz. In reality, oscillators always have some frequency deviation (or clock "noise" which is not constant) from their nominal frequency, and therefore these time bases will not be the same. Let $T(n)$ denote the time base (e.g., in clock ticks) of the master and $R(n)$ the time base of the slave. These two functions correspond to the timestamps of the two clocks at discrete time instants n, n=0, 1, 2, . . . .

Figure 4:
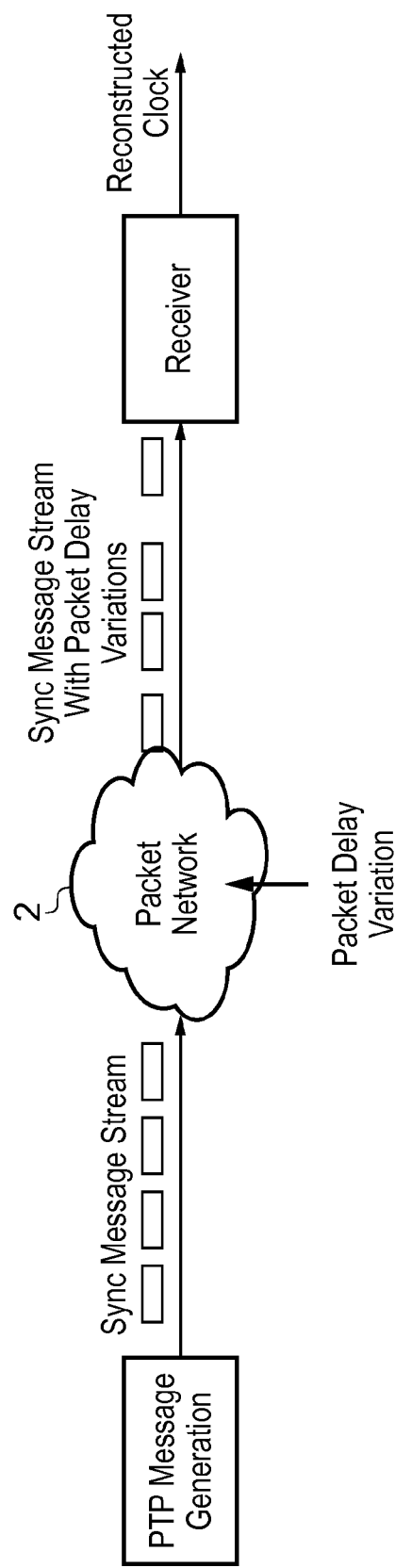
FIG. 4 shows, in schematic form, the effect of packet delay variation and has already been described.
Figure 5:
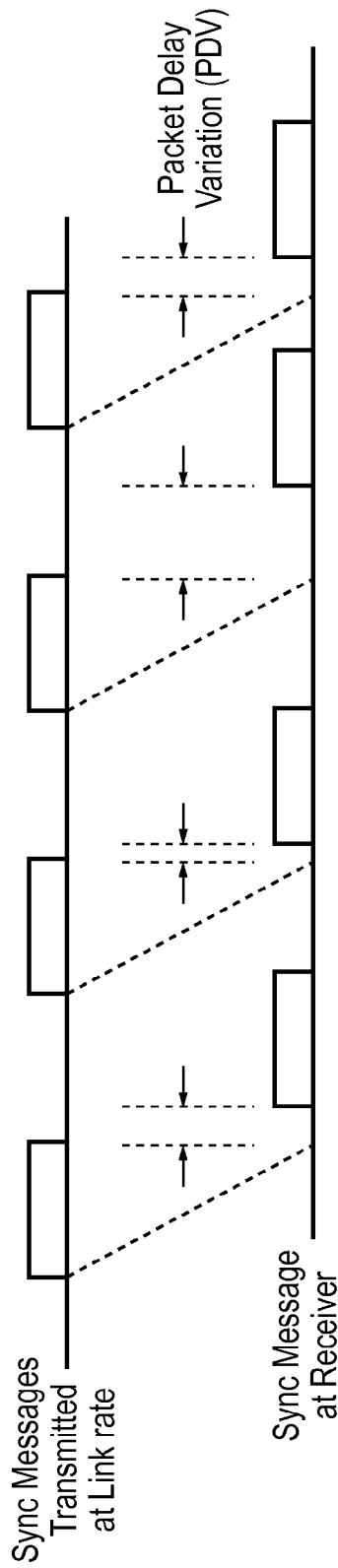
FIG. 5 shows the effects of packet delay variation on a generated stream of Sync messages and has already been described.
Figure 6:
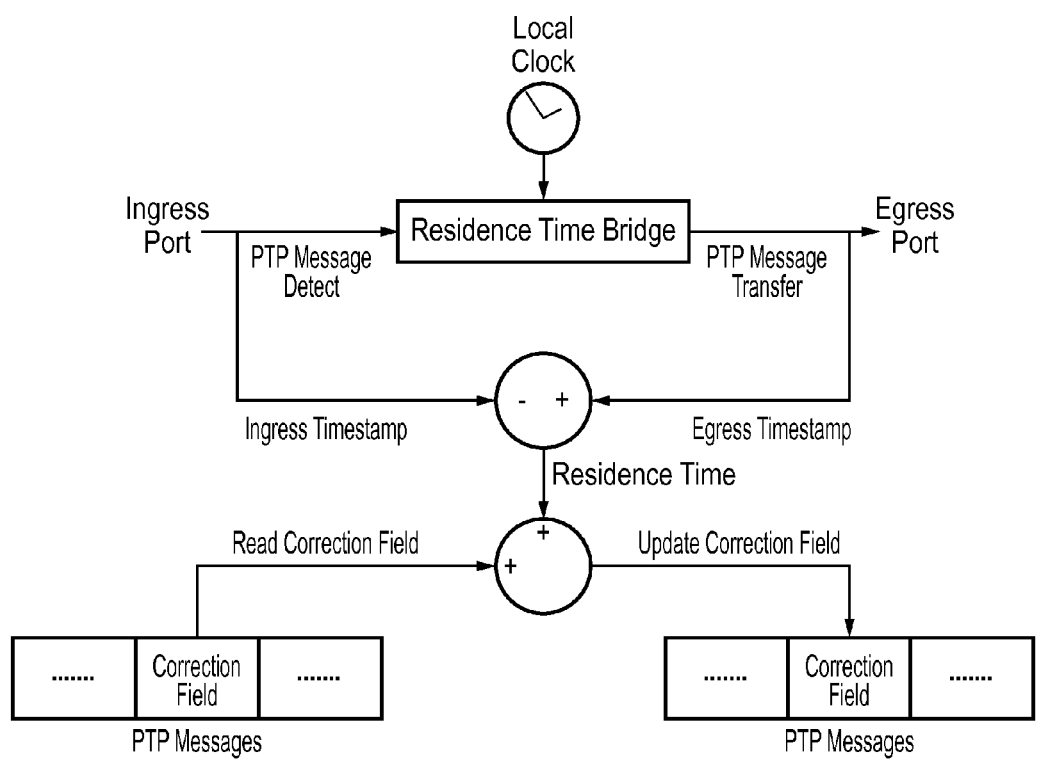
FIG. 6 shows, in schematic form, the use of End-to-End transparent clock corrections and has already been described.
Figure 7:
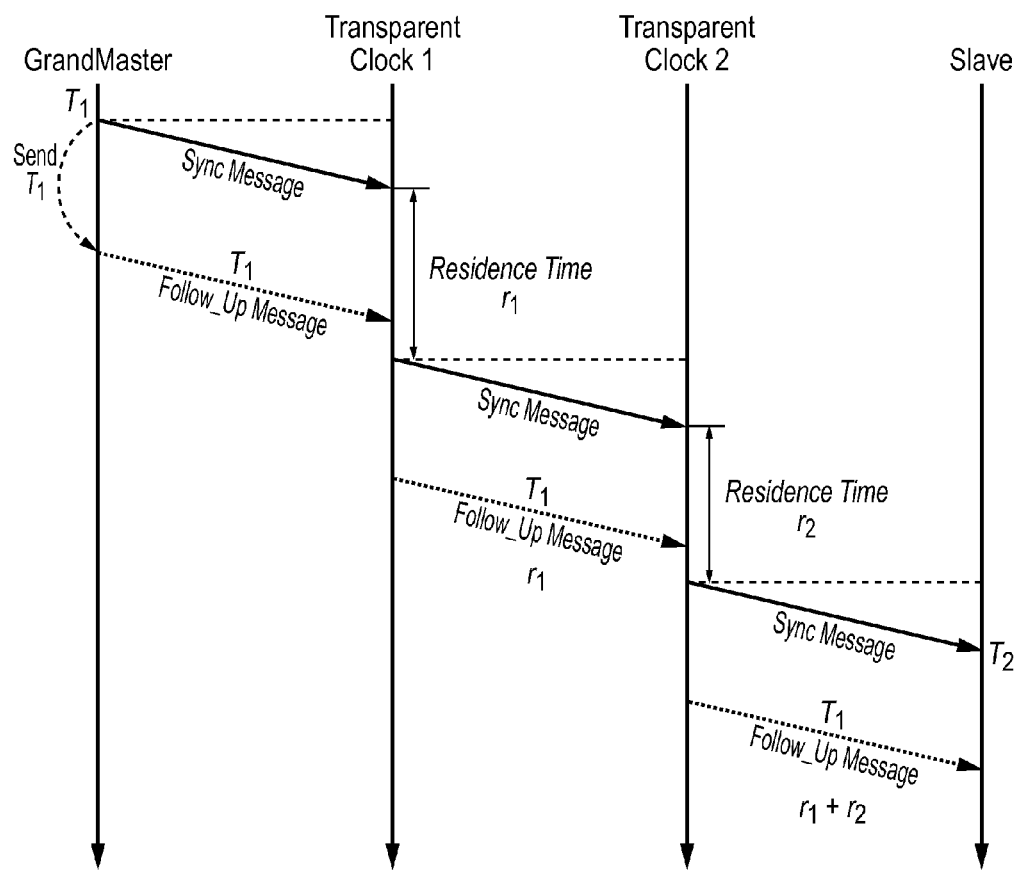
FIG. 7 shows the message flow through End-to-End transparent clocks and has already been described.
Figure 8:
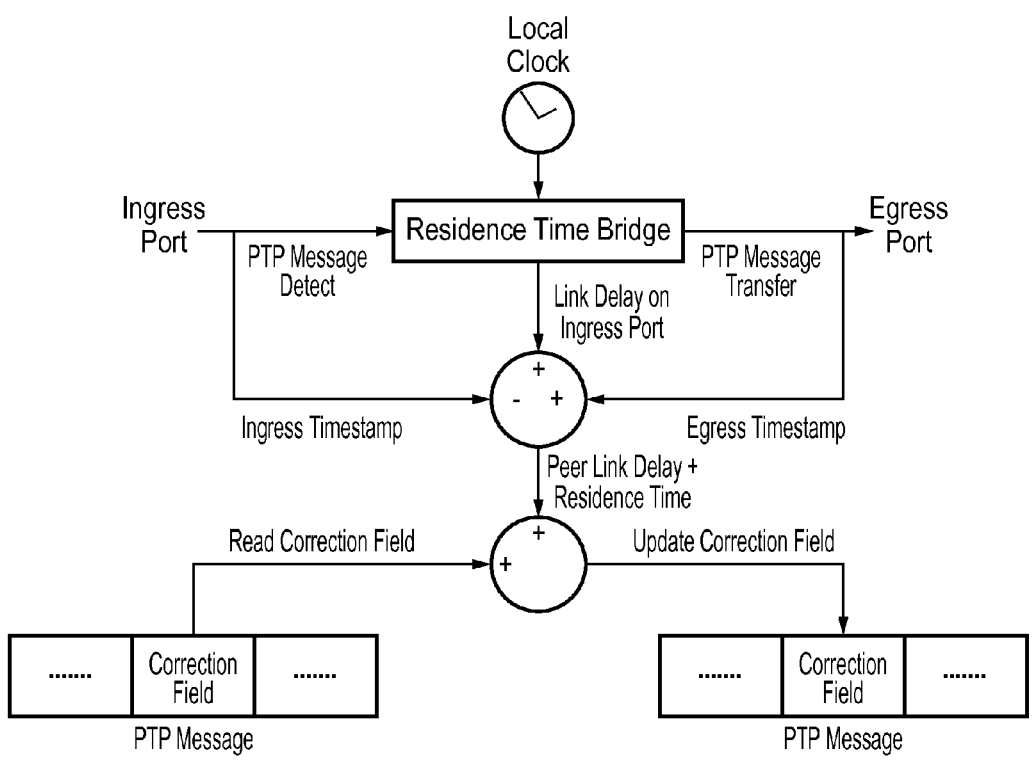
FIG. 8 shows, in schematic form, the use of Peer-to-Peer transparent clock corrections and has already been described.
Figure 9:
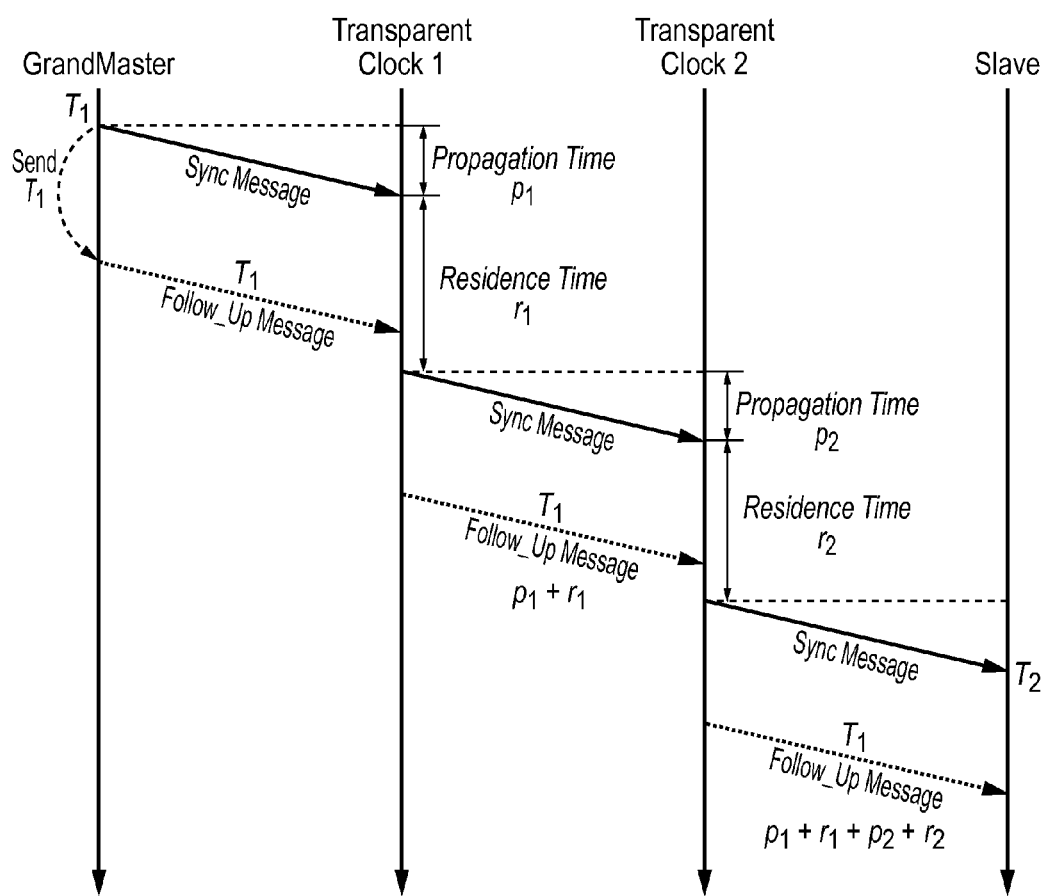
FIG. 9 shows the message flow through Peer-to-Peer transparent clocks and has already been described.
Figure 10:
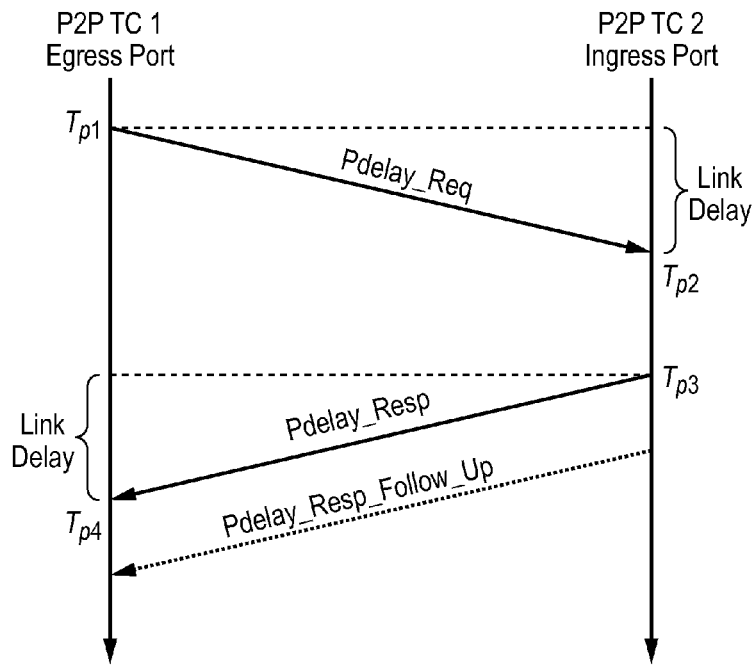
FIG. 10 shows the measurement of the Peer Link Delay and has already been described.
Figure 11:
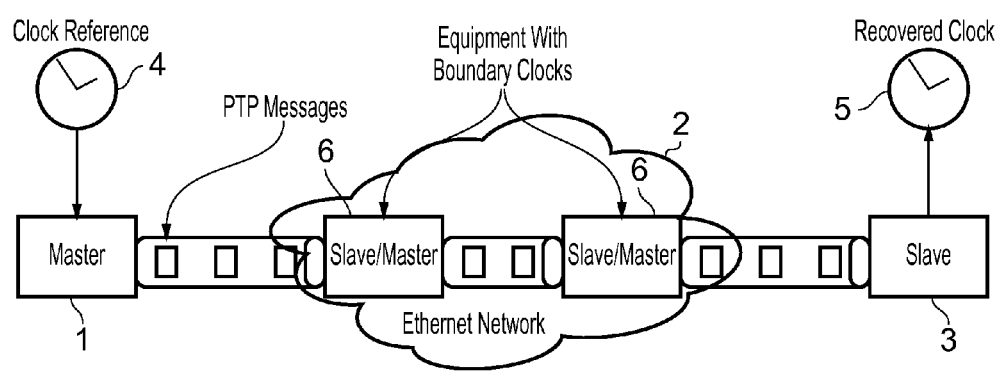
FIG. 11 shows the transfer of frequency/time information using Link-by-Link boundary clocks and has already been described.
Figure 12:
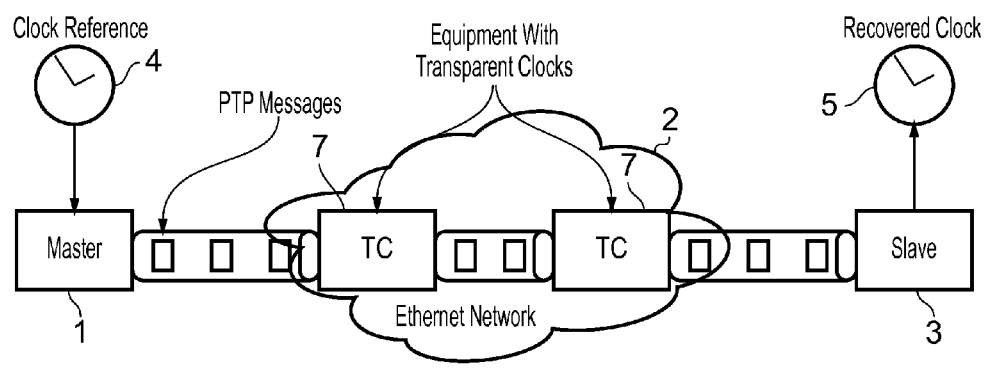
FIG. 12 shows the transfer of frequency/time information using Link-by-Link transparent clocks and has already been described.
Figure 15:
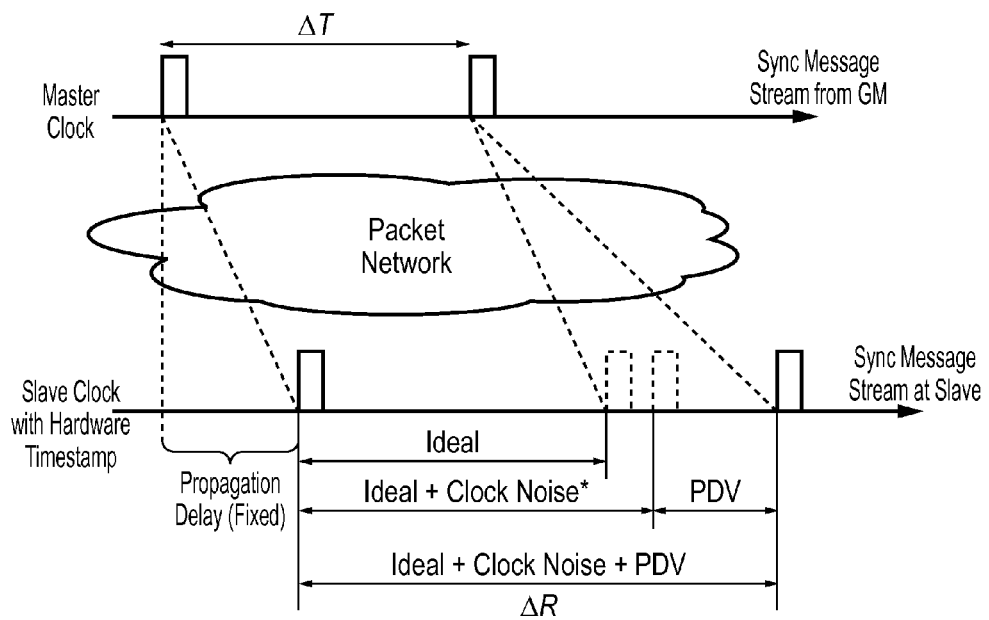
FIG. 15 shows the contribution of noise in a chain of devices between master and slave clocks.

When Sync messages are transmitted over the packet network, they will arrive at the slave with variable delay (as shown in FIG. 4 and FIG. 5 and described above). If $d(n)$ and $d(n-1)$ denote the delay experienced by the nth and (n-1)th Sync message at the slave, respectively, then the PDV induced by the network is given as $j(n)=d(n)-d(n-1)$. The timestamp difference between the nth and (n-1)th generated Sync message at the master is defined as $\Delta T(n)=T(n)-T(n-1)$. At the slave, the timestamp difference between the nth and (n-1)th Sync message arrivals as measured by the slave clock is defined as $\Delta R(n)=R(n)-R(n-1)$. Note that the timestamp difference measured by the slave includes the PDV experienced between the two arrivals ($j(n)$) plus clock noise ($N(n)$), that is, $\Delta R(n)=\Delta T(n)+j(n)+N(n)$. All these signals and the effect of the clock noise are depicted in FIG. 15.

Looking at the components of $\Delta R(n)$, we see that the PDV component $j(n)$ can easily be measured by TCs (and removed by the slave) but the clock noise component $N(n)$ can only be filtered out by the slave using appropriate filtering mechanisms to be described below. The filtering may have to handle also residual PDVs ($V(n)$) not captured by imperfect TC measurements of residence times. Note that the PDV $j(n)$ is relatively much larger (up to millisecond levels) in magnitude than the clock noise component $N(n)$ (which is on the order of clock cycles).

Embodiments of the present invention provide a clock recovery mechanism where we can measure the Sync inter-departure times $\Delta T(n)$ from the master, the total PDV (i.e., total residence time) experienced by the Sync, $j(n)$, and the Sync inter-arrival times at the slave $\Delta R(n)$. We then want to remove all the PDV that we can possibly account for ($\tilde{j}(n)$) from $\Delta R(n)$ (that is, $\Delta R^*(n)=\Delta R(n)-\tilde{j}(n)$). The result, $\Delta R^*(n)=\Delta T(n)+N(n)+V(n)$, still includes the clock noise ($N(n)$) plus residual PDV ($V(n)=j(n)-\tilde{j}(n)$).

Figure 16:
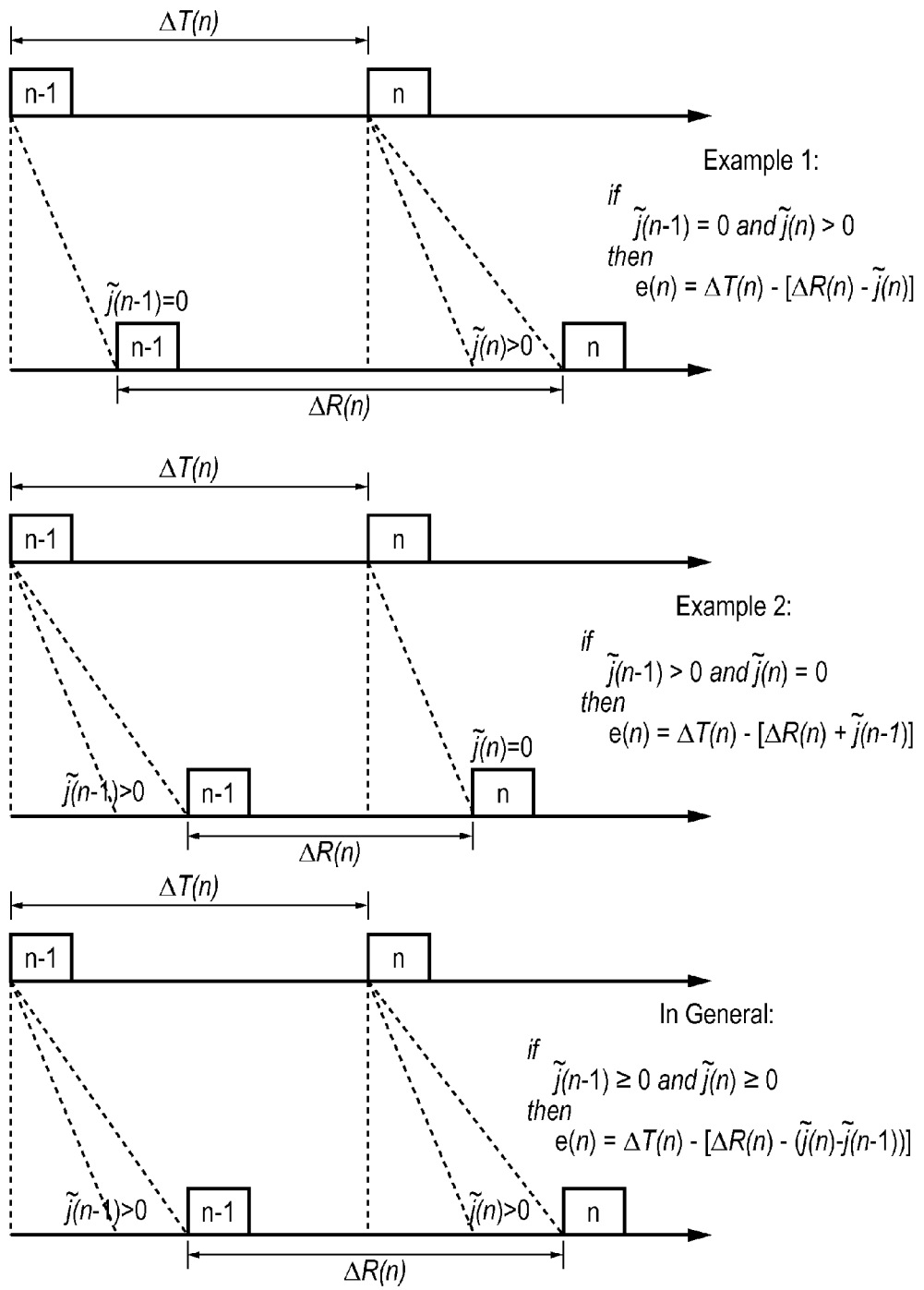
FIG. 16 shows how the total residence times or packet delay variations can be accounted for in phase-locked loop error signals in embodiments of the present invention.

In these embodiments, the difference between $\Delta T(n)$ and $\Delta R^*(n)$ forms an error signal, $e(n)=\Delta T(n)-\Delta R^*(n)$. This error signal can be filtered by the loop filter of a PLL whose output then controls the frequency $\hat{f}_s=1/\hat{\tau}_s$ of the local oscillator of the slave clock as shown in Error! Reference source not found. The function of the PLL is to control the slave clock frequency $\hat{f}_s$ such that the error e goes to zero at which point the slave clock frequency equals the master clock frequency $f_s$. So our control problem here is then formulated as: while filtering out PDV and other clock noise, control the slave clock frequency $\hat{f}_s=1/\hat{\tau}_s$ such that the slave clock measurements are equal to the master clock timestamp differences, that is, we want $\Delta R(n)-\tilde{j}(n)-N(n) \approx \Delta T(n)$ in the long term average sense. The quantity $\Delta T(n)$ serves as the PLL reference input and $\Delta R^*(n)$ as its output (i.e., the controlled variable). A detailed description of how the PDVs are compensated at the slave is shown in FIG. 16. The main idea of the compensation is to ensure that $\Delta R(n)$ after PDV compensation is roughly equal to $\Delta T(n)$.

Figure 17:
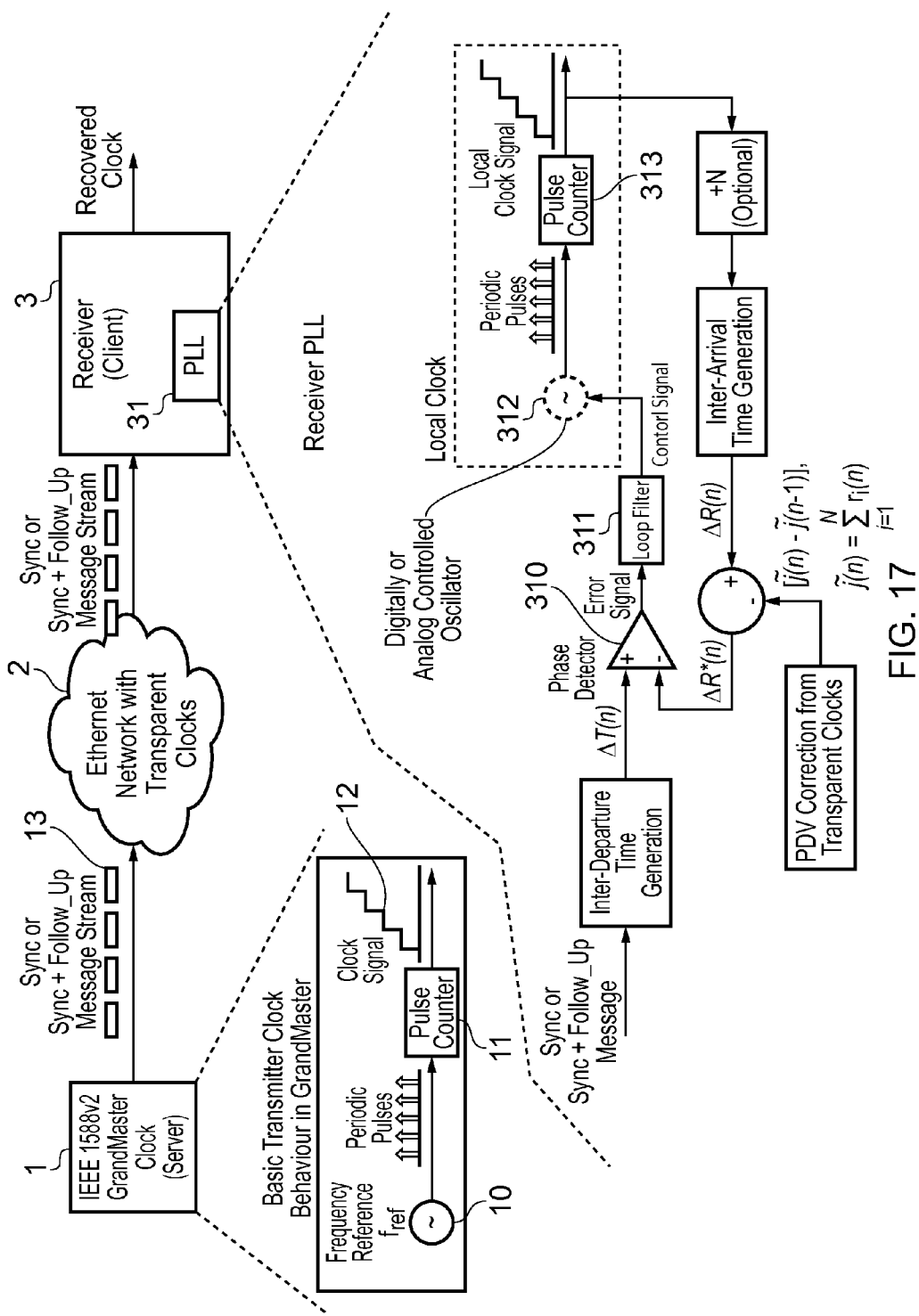
FIG. 17 shows a schematic view of the architecture of a master clock and a slave clock according to embodiments of the present invention.

FIG. 17 shows a high-level view of a clock synchronization scheme. This synchronization strategy allows multiple slaves 3, for example in a broadcast or point-to-multipoint communication scenario, to synchronize their clocks to the master 1. The master clock can be modeled simply as an oscillator 10 and a pulse counter 11. The oscillator 10 issues periodic pulses that constitute the input to the pulse counter 11. The output of the counter 11 represents the master clock signal 12 and is incremented by a fixed amount at each pulse. Samples or snapshots of the pulse counter 11 (master clock signals) are taken and communicated to the slave as timestamps in a stream of PTP messages 13.

The slave PLL 31 uses the timestamps (which constitute the PLL reference signal) to lock onto the master clock. The PLL has four main components: a phase detector 310, a loop filter 311, a controlled oscillator 312 (analog or digitally controlled), and a pulse counter 313. The phase detector 310 computes the error signal and the error signal is passed on to the loop filter 311 which is responsible for eliminating possible PDV and noise in the input signal. The controlled oscillator 312, which typically has a center frequency, oscillates at a frequency which is determined by the output signal of the loop filter 311.

A key attribute of the technique is that timing packet loss is not an issue because the slave PLL 31 mechanism integrates over several seconds' worth of timing packets. The timestamps are all relative to a stable time reference, not to the previous packet, therefore the slave 3 can simply wait for the next packet to arrive to obtain the information it requires. Therefore the loss of an individual packet or even a group of packets will have little effect on the clock recovery performance.

The following describes how residence times can be transported by the transparent clocks to the slaves 3:

E2E Transparent Clock: The correction field in the PTP message carries only the residence times implying its contents can be used directly in the proposed frequency synchronization mechanism described here.

P2P Transparent Clock: In this case, since the correction field in the PTP message is used to carry the residence times plus the link propagation delays, a type, length, value (TLV) field can be defined in the Sync or Follow_Up message for carrying only the residence time. Fortunately, IEEE 1588 allows all PTP messages to be extended by means of a standard TLV extension mechanism. In this case, the P2P TC has to be appropriately modified to capture the residence time and modified the related residence time defined TLV field in the Sync or Follow_Up message.

Role of the PLL Loop Filter

A perfect TC would not contribute to PDV because the residence time embedded in the correction field will be accurate and can be used by the slave to completely cancel out the effects of PDV. However, in practice, it becomes technically very challenging to implement a perfect TC because the TC functionality is usually implemented inside a networking device such as a switch or router. Typically a switch or router uses a number of strategically located buffers to queues, manage and prioritize packets. The queuing architecture typically adopted does not allow for efficient manipulation of the correction field to record accurately the residence time in the device. As an example, we consider the queuing arrangement shown in FIG. 18, which is typical in most switches and routers.

Figure 18:
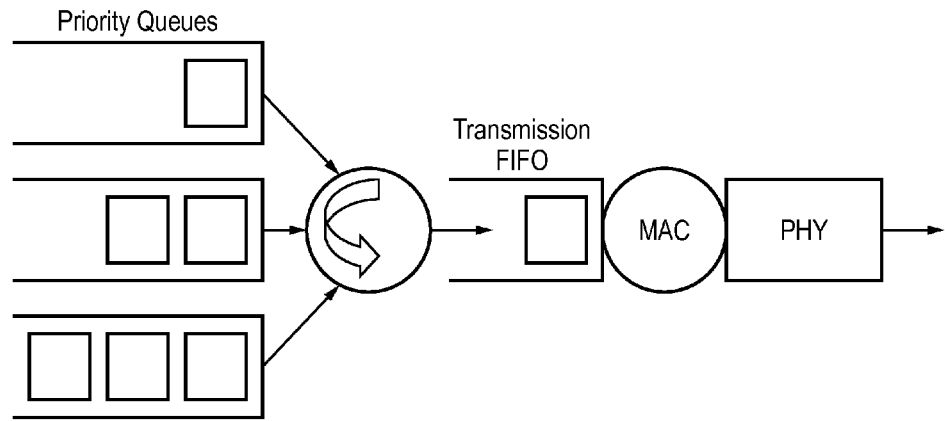
FIG. 18 shows, in schematic form, the effect of a bottleneck in a typical switch or router output interface.

As illustrated in FIG. 18, the final queue (i.e., the transmission queue), that sits just before the physical interface (PHY) poses problems for the TC operation. This first-in-first-out (FIFO) queue serves the medium access control (MAC) protocol. From an implementation point of view, it is very challenging to change the content of a packet when it is about to go out the PHY, particularly in the one-step clock mode. One would expect that once the correction field had been updated in the PTP packet, the packet theoretically should immediately be sent out of the PHY without any extra delay. However, in a switch or router where congestion occurs and packets are regularly sent out the PHY, it is likely that a packet has already begun transmission, hence making a PTP packet following it to wait until the current packet is fully transmitted out of the PHY. It is important to note that in this situation, Quality of Service prioritization does not help because a packet cannot be stopped from going out after the first byte has been transmitted.

With the above technical issues in mind, it should come as no surprise that some implementations result in inaccuracies in the correction field value. The inaccuracy will depend on transmission rate and the largest allowable Ethernet frame size. For example, at Gigabit Ethernet rates, it takes 12 μsec to transmit a 1518 byte packet and 525 μsec to transmit a 64 Kbyte jumbo packet.

The queuing structure described above is one source of inaccuracies in the TC operation. There are other factors that can introduce inaccuracies depending on the switch/router implementation. The inaccuracies in the correction field can be due to:

Different sized packets are not corrected to the same accuracy.

Residence time embedded in the correction field value is based on an average value instead of a packet-by-packet correction.

A fixed delay correction is being used instead of an average or packet-by-packet correction.

TC correction is different in both directions leading to asymmetry issues.

Figure 13:
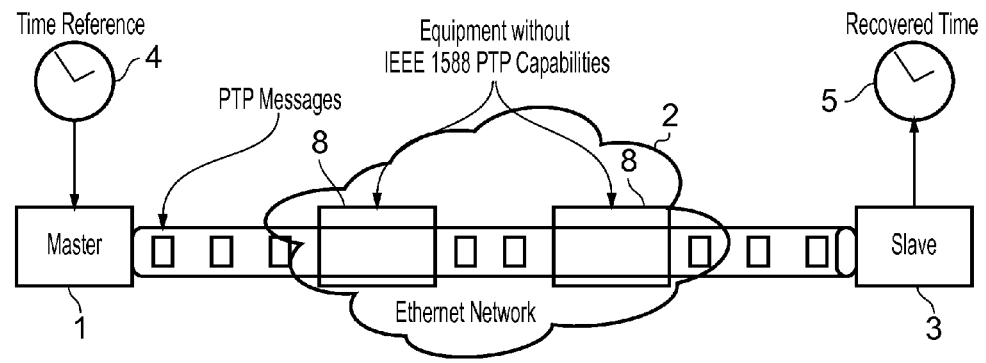
FIG. 13 shows the transfer of frequency/time information using End-to-End transparent clocks and has already been described.
Figure 14:
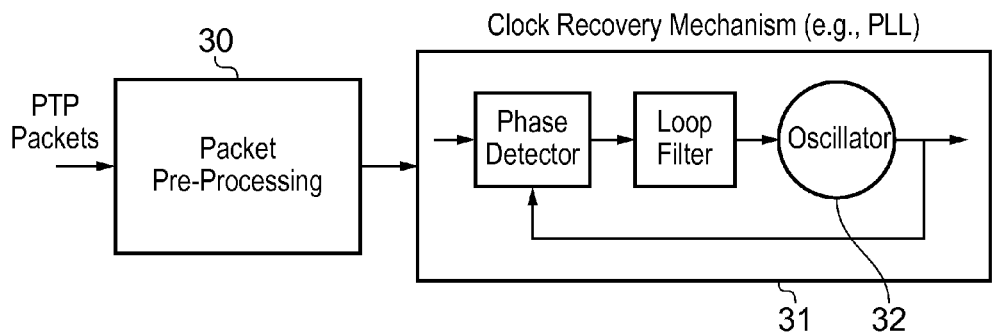
FIG. 14 shows, in schematic form, a clock recovery mechanism using a packet selection algorithm and has already been described.
Figure 19:
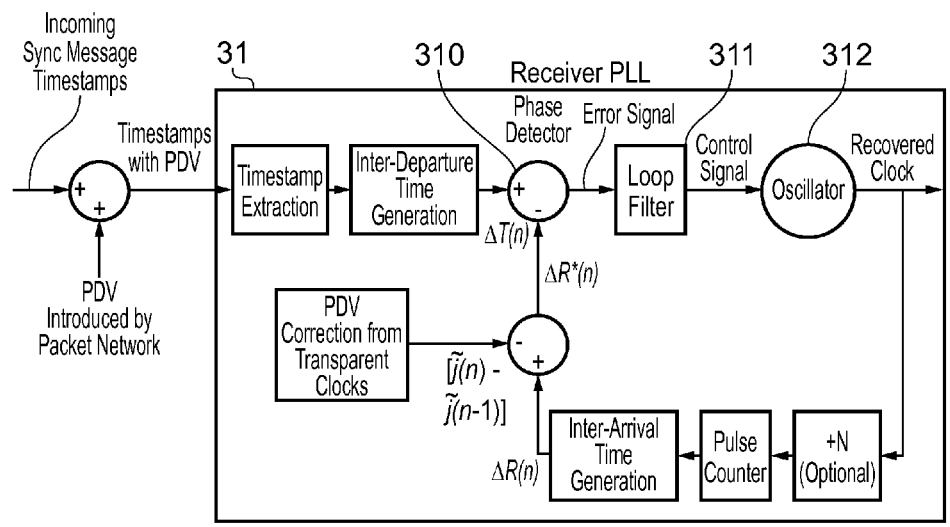
FIG. 19 shows the architecture of a phase-locked loop in a receiver according to an embodiment of the present invention.

At this point we see that when errors exists in the TCs, the correction field arriving at a slave will not be the true PDV on the path—there will still be some residual PDV resulting from the (in)accuracies in the TCs. This means there will always be some residual "noise" resulting from the "imperfect" TC. The loop filter 311 is responsible for filtering out this residual noise in addition to the incoming clock wander and jitter and local clock noise (FIG. 19). In the case where the TCs are free-running, the PLL loop filter 311 must take care of the measurement noise (errors) arising from using free-running clocks. But it should be noted here that the residual PDV will be much less than the end-to-end case where TCs are not used. Even TCs which are not frequency locked to the master will still give PDVs that are much less than the end-to-end case (see FIG. 13 and the accompanying description above). The level of PDV will still be considerably low that the loop filter can be designed to give near TDM like behavior.

Frequency Distribution to Slave Clocks

Figure 20:
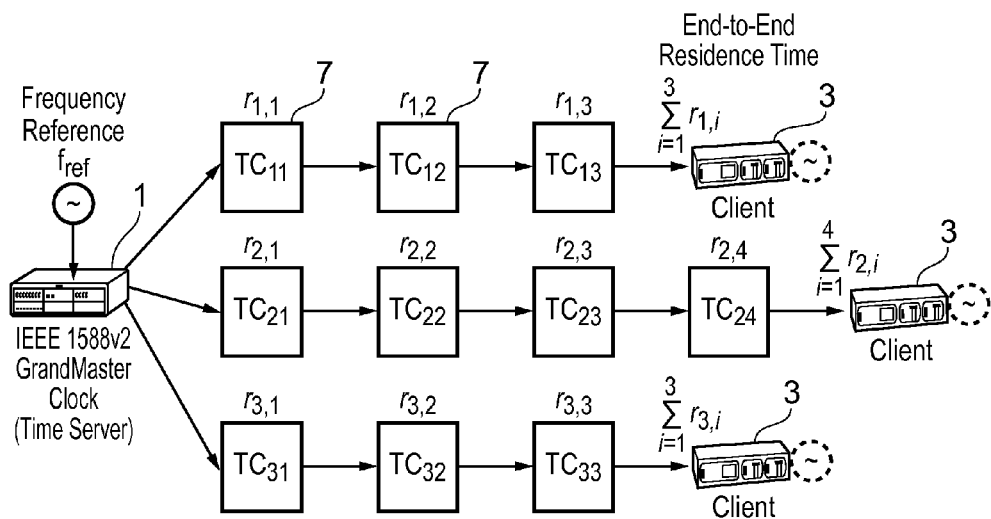
FIG. 20 shows, in schematic form, the process of frequency distribution using transparent clocks.

As shown in FIG. 20, the transparent clock devices 7 on the communication path to each slave 3 measure the delay the Sync packet resides in the TC device 7 and increments the correction field in the PTP header. By doing so, the slave clock 3 or boundary clock further down the line can determine how long the Sync packet resided in the TC devices 7 before it. The slave 3 can then use the values in the correction field to reduce the effects PDV on its path.

Designing the PLL Loop Filter

Figure 21:
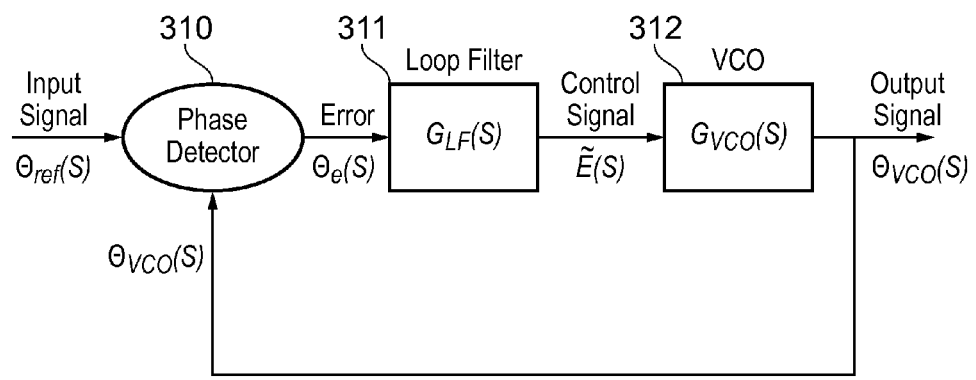
FIG. 21 shows a basic block diagram of an analog PLL.

A PLL is essentially a feedback control system as illustrated in FIG. 21. Thus, we need mathematical models (e.g., in the form of transfer functions) of the loop components to determine the parameters of the loop filter. For the purpose of our analysis here, we assume the PLL oscillator 312 to be a voltage controlled oscillator (VCO). In this case, the filtered error from the loop filter 311 is converted to a digital word, and passed to a digital-to-analog converter (DAC) whose output controls the VCO 312. The control analysis is the same even if other oscillators, whether analog or digital are used. It is noted that when the PLL has acquired lock and is not pulled out by large phase steps, frequency steps, or phase noise applied to its reference input, its performance can be analyzed by a linear model.

Since the sampling rate of the system proposed (i.e., Sync message rate of 1 to 128 Hz) is much higher than (a lot greater than two times) the PLL bandwidth, a continuous-time analysis can be used for this discrete-time system. Typical telecom synchronization PLLs have bandwidth much less than 1 Hz (e.g., 1 mHz). The analog or continuous-time PLL consists of a phase detector 310, a loop filter 311 and VCO 312, for example as shown FIG. 21. The phase detector 310 can simply be represented by a constant gain $K_{PD}$. The VCO 312 can be modeled as a perfect integrator in the Laplace domain as $G_{VCO}(s)=K_{VCO}/s$, where $K_{VCO}$ is its gain. The loop filter 311 can be specified in Laplace domain as $G_{LF}(s)$. In the absence of noise, the closed-loop transfer function and normalized phase error response are specified in the Laplace domain, respectively, as $$G_{PLL}(s) = \frac{\Theta_{VCO}(s)}{\Theta_{ref}(s)} = \frac{K_{PD} K_{VCO} G_{LF}(s)}{s + K_{PD} K_{VCO} G_{LF}(s)}, \quad (1)$$

and $$\frac{\Theta_e(s)}{\Theta_{ref}(s)} = \frac{\Theta_{ref}(s) - \Theta_{VCO}(s)}{\Theta_{ref}(s)} \quad (2)$$
$$= \frac{s}{s + K_{PD} K_{VCO} G_{LF}(s)}$$
$$= 1 - G_{PLL}(s)$$

where $\Theta_{VCO}(s)$, $\Theta_{ref}(s)$, and $\Theta_e(s)$ are the Laplace transforms of the VCO phase $\theta_{VCO}(t)$ reference signal phase $\theta_{ref}(t)$, and phase error $\theta_e(t)$, respectively.

We consider here a second-order lag-lead filter (also known as a proportional-integral (PI) filter) which has transfer function $$G_{LF}(s) = \frac{1 + s\tau_2}{s\tau_1}, \quad (3)$$

where $\tau_1$ and $\tau_2$ are time constants of the filter. The filter has a pole at s=0 and therefore behaves like an integrator. It has (at least theoretically) infinite gain at zero frequency. The closed-loop transfer function of the PLL with this filter is of the form $$G_{PLL}(s) = \frac{2\zeta\omega_n s + \omega_n^2}{s^2 + 2\zeta\omega_n s + \omega_n^2} = \frac{2\zeta\omega_n s + \omega_n^2}{(s - s_0)(s - s_1)}, \quad (4)$$

where $\omega_n$ and $\xi$ are the natural frequency and damping factors, respectively, and are specified in terms of $K_{PD}$, $K_{VCO}$, $\tau_1$ and $\tau_2$ as $$\omega_n = \sqrt{\frac{K_{PD} K_{VCO}}{\tau_1}} \; ; \; \zeta = \frac{\omega_n \tau_2}{2} \quad (5)$$

These two parameters are usually used to specify performance requirements of a system. The poles of the closed loop system are $$s_{0,1} = -\xi\omega_n \pm j\omega_n \sqrt{1-\xi^2}. \quad (6)$$

When $\tau>1$, the poles are real; and when $\xi<1$, the poles are complex and conjugate. When $\xi=1$, the poles are repeated and real and the condition is called critical damping. When $\xi<1$, the response is underdamped and the poles are complex. The transient response of the closed-loop system is increasingly oscillatory as the poles approach the imaginary axis when $\xi$ approaches zero.

Typically, performance specification for feedback control systems often involves certain requirements associated with the time response of the system. It is important to note that damping ratios in desynchronizers and clocks in telecom systems have gain peaking of 0.1 dB or 0.2 dB, respectively (corresponding to damping ratios of 4.3188 and 2.9585, respectively). This makes telecom synchronization overdamped systems. In a second-order PLL, the loop bandwidth $B_w$, damping ratio $\xi$, and natural frequency $\omega_n$ are related by $$B_w = \frac{\omega_n}{2\pi}\sqrt{2\zeta^2 + 1 + \sqrt{(2\zeta^2+1)^2 + 1}}. \quad (7)$$

Following telecom industry practice, the second-order PLL with PI filter are implemented to have closed-loop bandwidth $B_w$=1 Hz or less and damping ratio $\xi\geq 3$. Thus, for a second-order system, by specifying $B_w$ and $\xi$, the natural frequency $\omega_n$, and the filter constants $\tau_1$ and $\tau_2$ can easily be determined from the above equations.

In a practical design of the PLL, some parameters are initially given (or can be determined from manufacturer datasheets) such as the VCO parameter $K_{VCO}$. The remaining parameters ($\tau_2$ and $\tau_1$) then have to be chosen for the best dynamic performance and maximum stability of the system. We assume that the phase detector gain is set to one ($K_{PD}$=1) and its effects are lumped into the computation of the parameters of the loop filter.

Now knowing the two parameters of the loop filter $G_{LF}(s)$, we want to find a set of difference equations (or $G_{LF}(z)$ for the digital implementation of the filter). Using the Tustin's or bilinear approximation for the digitization of $G_{LF}(s)$, for every occurrence of s in the loop filter we substitute $$s = \frac{2}{\Delta t}\left(\frac{1-z^{-1}}{1+z^{-1}}\right), \quad (8)$$

where $\Delta t$ is the sampling interval for the system. Thus, we have $$G_{LF}(z) = G_{LF}(s)\big|_{s=\frac{2}{\Delta t}\left(\frac{1-z^{-1}}{1+z^{-1}}\right)} \quad (9)$$
$$= \frac{\tilde{E}(z)}{E(z)}$$
$$= \frac{1 + \frac{2\tau_2}{\Delta t}\left(\frac{1-z^{-1}}{1+z^{-1}}\right)}{\frac{2\tau_1}{\Delta t}\left(\frac{1-z^{-1}}{1+z^{-1}}\right)},$$

which gives the following difference equation for implementing the loop filter for the second-order loop $$\tilde{e}(n) = \tilde{e}(n-1) + \frac{\Delta t + 2\tau_2}{2\tau_1}e(n) + \frac{\Delta t - 2\tau_2}{2\tau_1}e(n-1). \quad (10)$$

With this equation, the phase detector (which involves simple subtraction) and the loop filter can be implemented in the digital domain with sampling interval $\Delta t$.

Digital-to-Analog Convertor (DAC) Model

Figure 22:
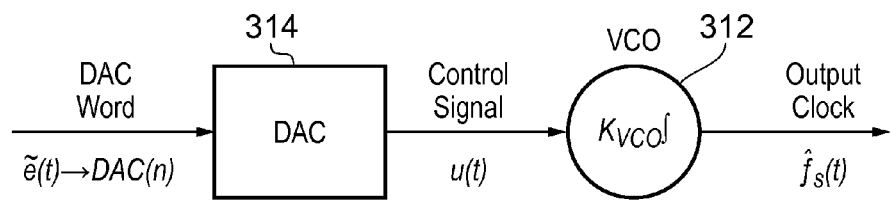
FIG. 22 shows a block diagram of a digital-to-analog converter and a voltage-controlled oscillator.

Next we derive the transfer function of the DAC 314 since the systems in these embodiments involve a DAC-VCO combination, for example as shown in FIG. 22, for generating the output frequency at the slave clock.

The DAC 314 and the VCO 312 determine the accuracy of the PLL 31. Let us define the following variables:
u(t)=DAC output voltage (in volts)
$\Delta V_{DAC}$=DAC output voltage range (which is also the VCO input voltage range)
$DAC_{res}$=DAC resolution (range)=$2^L$, where L is the DAC register length in bits, e.g., L=12 bits Thus, given a filtered error value $\tilde{e}(t)$, the DAC 314 produces a voltage according to the following formula:

$$u(t) = \frac{\Delta V_{DAC}}{DAC_{res}} \cdot \tilde{e}(t). \quad (11)$$

The above equation means that the VCO input voltage range $\Delta V_{DAC}$ is quantized into $DAC_{res}$ values (the DAC range). We also assume in the equation that the filtered error value $\tilde{e}(t)$ is expressed as an integer number 0 to $DAC_{res}-1$. This requires a mapping from filtered error space $[\tilde{e}_{min}, \tilde{e}_{max}]$ to the DAC space $[0, DAC_{res}-1]$. The Laplace transform of the expression is given as $$U(s) = \frac{\Delta V_{DAC}}{DAC_{res}} \cdot \tilde{E}(s), \quad (12)$$

from which we get the DAC transfer function $$G_{DAC}(s) = \frac{U(s)}{\tilde{E}(s)} = \frac{\Delta V_{DAC}}{DAC_{res}}, \quad (13)$$

and where $\tilde{E}(s)$ and $U(s)$ are the Laplace transforms of $\tilde{e}(t)$ and $u(t)$, respectively.

Voltage Controlled Oscillator (VCO) Model

Here we assume that the DAC output voltage $u(t)$ does not need any amplification, thus $A=1$. The VCO 312 oscillates at an angular frequency $\omega_{VCO}(t)$ which is determined by the DAC output voltage $u(t)$. The angular frequency of the VCO $\omega_{VCO}(t)$ is given by $$\omega_{VCO}(t) = \omega_o + K_{VCO} u(t), \quad (14)$$

where $\omega_o = 2\pi f_o$ is the center angular frequency of the VCO (expressed in rad/sec), $f_o$ is the center frequency in Hertz, $K_{VCO}$ is the VCO gain (in rad/sec-V). The deviation of the VCO from its center frequency is $\Delta\omega_{VCO}(t) = K_{VCO} u(t)$.

By definition, the VCO phase $\theta_{VCO}$ is given by the integral over the frequency variation $\Delta\omega = \omega_{VCO}(t) - \omega_o$, that is, $$\theta_{VCO}(t) = \int_0^t \Delta\omega(x) dx = K_{VCO} \int_0^t u(x) dx. \quad (15)$$

Denoting $\Theta_{VCO}(s)$ as the Laplace transform of $\Theta_{VCO}(t)$, the Laplace transform of the above expression is given by $$\Theta_{VCO}(s) = \frac{K_{VCO}}{s} U(s), \quad (16)$$

from which we get the transfer function of the VCO as $$G_{VCO}(s) = \frac{\Theta_{VCO}(s)}{U(s)} = \frac{K_{VCO}}{s}. \quad (17)$$

This expression shows that the VCO represents a pure integrator for phase signals. The operation of the PLL is complicated by the fact that it has to track the reference clock and simultaneously reject short term variations. From a functional point of view, two major requirements are specified for a system PLL:

To provide a very stable clock, synchronized to the external network to run all elements of the system.

To provide a stable clock in case synchronization is lost (holdover mode). In this case the feedback loop is open and the circuit does not behave as a PLL.

Figure 23:
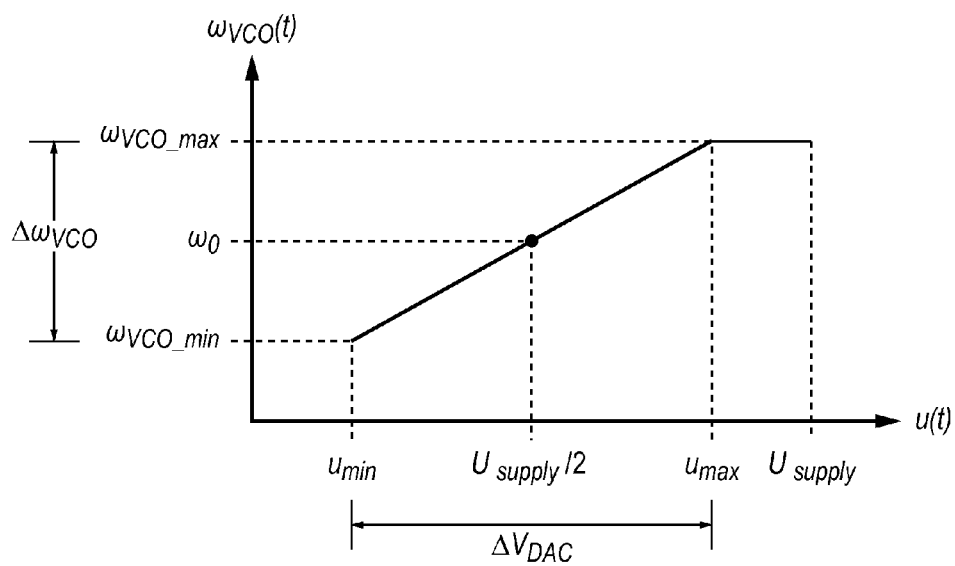
FIG. 23 shows the characteristic curve of an ideal voltage-controlled oscillator.

The gain of the VCO 312 can be computed from the VCO data sheet (obtained from the supplier). The first requirement is the determination of the supply voltage(s) of the VCO (this can be determined from the data sheet). For example, the VCO circuit can be powered from a unipolar +5V supply. Let the VCO supply voltage be denoted by $U_{supply}$. The VCO control signal $u(t)$ is usually limited to a range which is smaller than the supply voltage $U_{supply}$. Let $u_{min}$ and $u_{max}$ be the minimum and maximum value allowed for $u(t)$, respectively. With these, the VCO transfer characteristic curve is described as shown in FIG. 23.

The VCO is required to generate the frequency $\omega_{VCO\_min}$ when $u(t) = u_{min}$, and the frequency $\omega_{VCO\_max}$ when $u = u_{max}$. Now the angular frequency is determined at $u = U_{supply}/2$ which corresponds to a frequency $\omega_o$ that is considered as the center frequency of the PLL (irrespective of the fact that the center frequency could be varying (e.g., due to temperature effects, aging)). From Error! Reference source not found, the VCO gain can be calculated as $$K_{VCO} = \frac{\omega_{VCO\_max} - \omega_{VCO\_min}}{u_{max} - u_{min}} = \frac{\Delta\omega_{VCO}}{\Delta V_{DAC}}. \quad (18)$$

The frequency axis of the VCO characteristics is sometimes expressed in Hertz instead of radians per second. In this case, the gain is obtained as $$K_{VCO} = \frac{2\pi(f_{VCO\_max} - f_{VCO\_min})}{u_{max} - u_{min}} = \frac{2\pi \cdot \Delta f_{VCO}}{\Delta V_{DAC}}. \quad (19)$$

Furthermore, if the frequency axis is expressed in parts-per-million (ppm) of the VCO center frequency, the gain is calculated as $$K_{VCO} = \frac{2\pi \cdot f_o \cdot \Delta ppm}{\Delta V_{DAC}}, \quad (20)$$

where $f_o$ is the VCO center frequency and $\Delta ppm$ is the VCO output frequency range in ppm.

Frequency Synchronization Algorithms

In this section we describe the algorithms used by the slave PLL 31 to synchronize its frequency to the master's. A Sync message is transmitted by a master 1 to its slaves 3. It either contains the accurate time of its transmission (one-step clock) or is followed by a Follow_Up message containing this time (two-step clock).

One-Step Clock Algorithm

Figure 24:
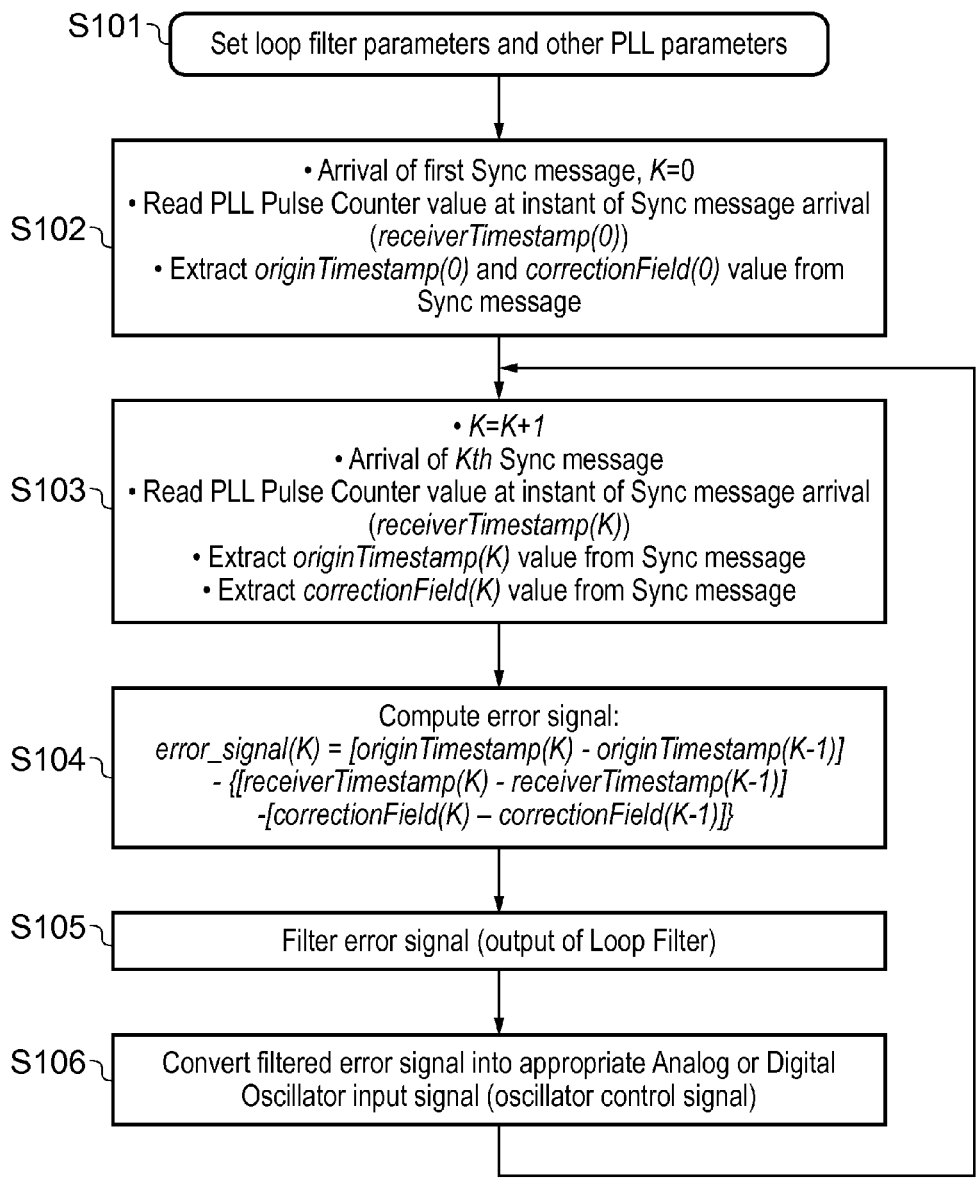
FIG. 24 is a flow chart showing the one-step clock algorithm according to an embodiment of the present invention.
Figure 25:
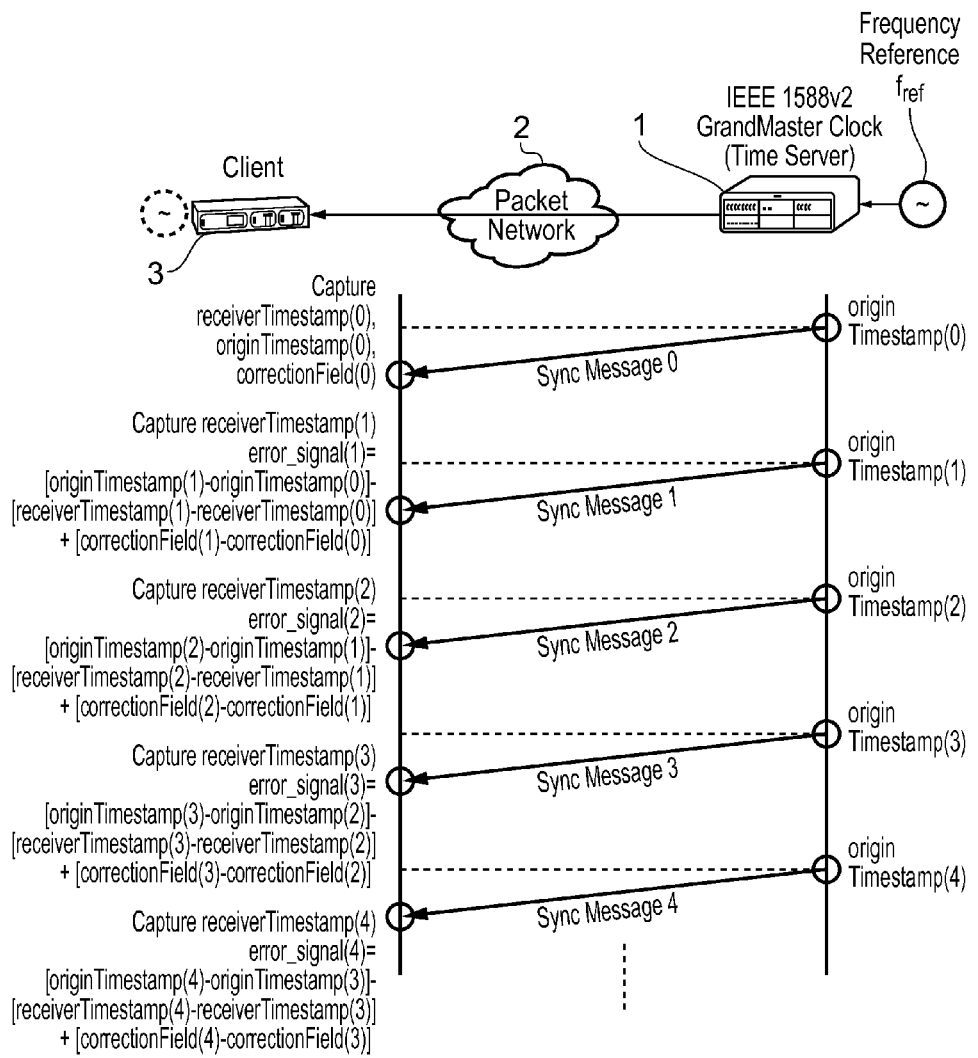
FIG. 25 shows the message processing in the one-step clock algorithm of FIG. 24.

In order to estimate and mitigate oscillator drifts, the master clock 4 periodically sends a Sync message based on its local reference clock to a slave clock 5 on the network. In the one-step clock mode, the master 1 marks the exact time the Sync message is sent in the Sync when it departs. The exact time is inserted into the Sync message "on-the-fly" by the hardware. There is no need to send a Follow_Up message with the exact time information to the slave clock. The slave clock 5 timestamps the arrival of the Sync message using its local time base. FIG. 24 is a flowchart setting out a PLL algorithm at the slave 3 for a one-step clock mode according to an embodiment of the present invention. The processing steps involved are illustrated in FIG. 25.

In the one-step clock algorithm, the steps are as follows:

After the initial set up of the loop filter parameters and the other parameters of the PLL 31 (S101), at the arrival of the first Sync message (S102): a counter K is set to zero; the PLL pulse counter 313 is read at the instant of the message arrival and this value is allocated to variable receiverTimestamp(0); and the origin timestamp and correction field information are extracted from the Sync message and allocated to variables originTimestamp(0) and correctionField(0) respectively.

The following steps (S103 to S106) are then repeated on the arrival of successive Sync messages.

The counter K is incremented by 1 and, on arrival of the Kth Sync message: the PLL pulse counter 313 is read at the instant of the message arrival and this value is allocated to the variable receiverTimestamp(K); and the origin timestamp and correction field information are extracted from the Sync message and allocated to the variables originTimestamp(K) and correctionField(K) respectively (S103).

The error signal is then computed (S104) according to the following formula:

$$\text{error\_signal}(K)=[\text{originTimestamp}(K)-\text{originTimestamp}(K-1)]-\{[\text{receiverTimestamp}(K)-\text{receiverTimestamp}(K-1)]-[\text{correctionField}(K)-\text{correctionField}(K-1)]\}$$

The error signal is then filtered by the loop filter 311 (S105) and the filtered error signal converted into the appropriate analog or digital input signal (the oscillator control signal) to the PLL oscillator 312 (S206).

Note that in the frequency synchronization algorithms described in the figures, the correctionField variable refers to the accumulated residence times in the correction field of the PTP message when E2E TCs are used and to residence times in the special TLV field when P2P TCs are used.

Two-Step Clock Algorithm

Figure 26:
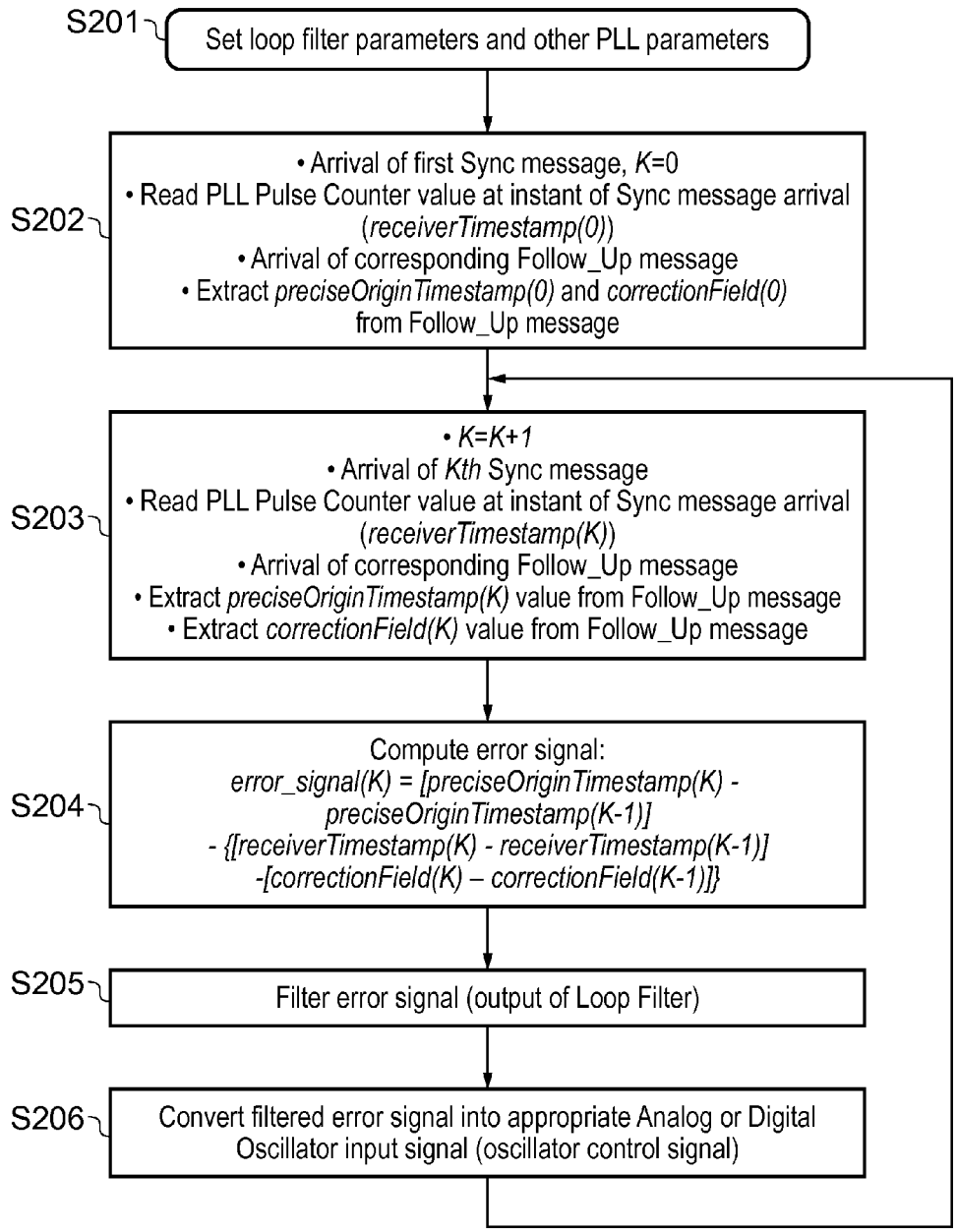
FIG. 26 is a flow chart showing the two-step clock algorithm according to an embodiment of the present invention.
Figure 27:
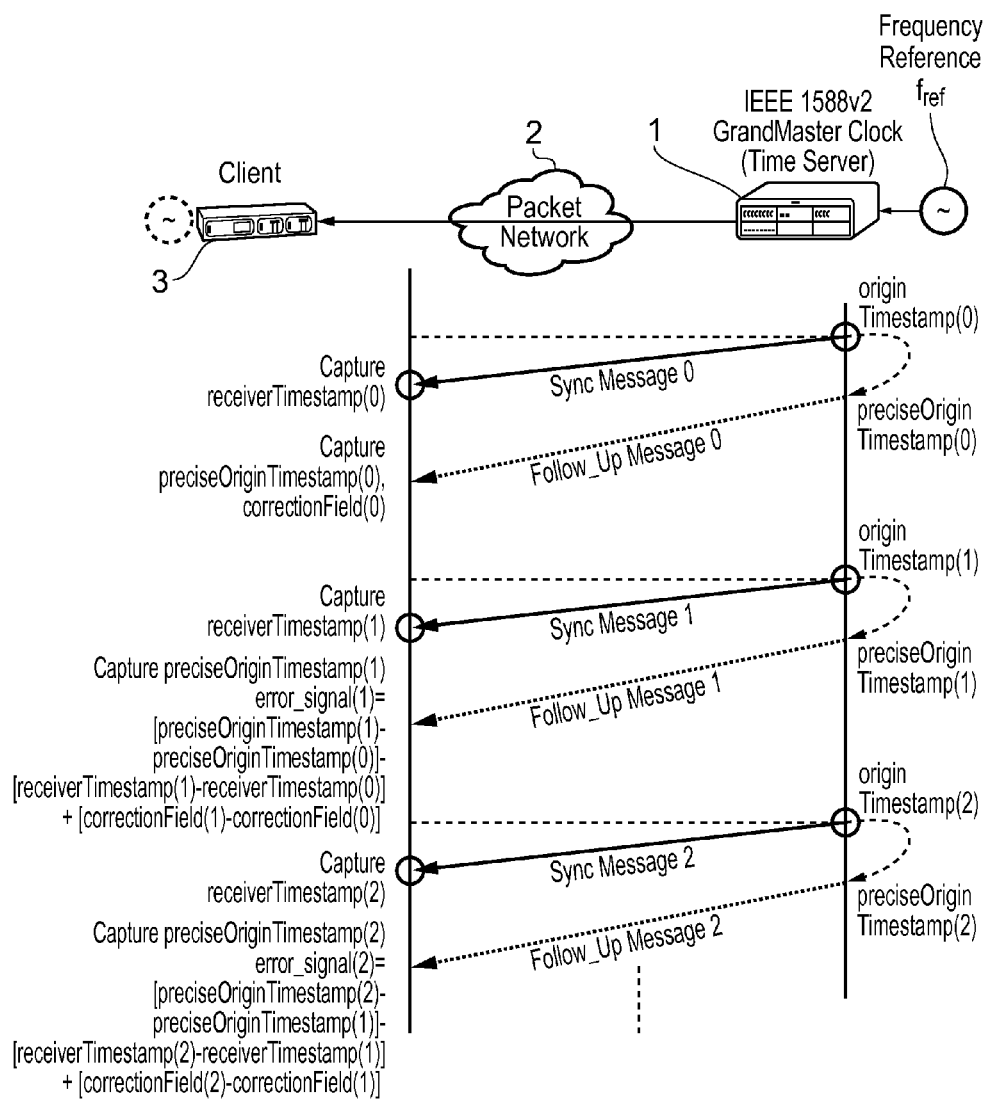
FIG. 27 shows the message processing in the two-step clock algorithm of FIG. 26.

In the two-step-mode the master 1 sends a Sync message with an estimated value of the time the message departs to the slave 3. Parallel to this, the time at which the message leaves the master 1 is measured as precisely as possible. The master 1 then sends this exact transmission time of the Sync message to the slave 3 in a Follow-Up message. The slave clock 5 timestamps the arrival of the Sync message using its local time base. FIG. 26 is a flowchart setting out a PLL algorithm at the slave 3 for a two-step clock mode according to an embodiment of the present invention. The processing steps involved are illustrated in FIG. 27.

In the two-step clock algorithm, the steps are as follows:

After the initial set up of the loop filter parameters and the other parameters of the PLL 31 (S201), at the arrival of the first Sync message (S202) a counter K is set to zero; the PLL pulse counter 313 is read at the instant of the message arrival and this value is allocated to variable receiverTimestamp(0); at the arrival of the corresponding Follow_Up message, the preciseorigin timestamp and correction field information are extracted from the Follow_Up message and allocated to variables preciseoriginTimestamp(0) and correctionField(0) respectively.

The following steps (S203 to S206) are then repeated on the arrival of successive Sync messages.

The counter K is incremented by 1 and, on arrival of the Kth Sync message the PLL pulse counter 313 is read at the instant of the message arrival and this value is allocated to the variable receiverTimestamp(K); at the arrival of the corresponding Follow_Up message, the preciseorigin timestamp and correction field information are extracted from the Follow_Up message and allocated to the variables preciseoriginTimestamp(K) and correctionField(K) respectively (S203).

The error signal is then computed (S204) according to the following formula:

$$\text{error\_signal}(K)=[\text{preciseoriginTimestamp}(K)-\text{preciseoriginTimestamp}(K-1)]-\{[\text{receiverTimestamp}(K)-\text{receiverTimestamp}(K-1)]-[\text{correctionField}(K)-\text{correctionField}(K-1)]\}$$

The error signal is then filtered by the loop filter 311 (S205) and the filtered error signal converted into the appropriate analog or digital input signal (the oscillator control signal) to the PLL oscillator 312 (S206).

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

All references referred to above are hereby incorporated by reference.

The invention claimed is:

1. A method of synchronising the frequency of an oscillator in a slave device to the frequency of a master clock in a master device, the method including the steps of:

a) receiving in the slave device a first message from said master device having a first time-stamp which is a time-stamp of said master clock indicating the precise time of sending of said first message and a first correction value which is the cumulative delay encountered by the message during its passage from the master device to the slave device;

b) extracting said time-stamp and said correction value from said first message and recording a first value of a counter in the slave device at the time of receipt of the first message;

c) receiving in the slave device a further message from said master device having a second time stamp which is a time-stamp of said master clock indicating the precise time of sending of said further message and a second correction value which is the cumulative delay encountered by the message during its passage from the master device to the slave device;

d) extracting said time-stamp and said correction value from said further message and recording a further value of the counter in the slave device at the time of receipt of the further message;

e) determining an error signal which is representative of the difference between the first time-stamp and the further time-stamp and the first value of the counter and the further value of the counter, adjusted by the difference between the first correction value and the further correction value; and f) adjusting the frequency of the oscillator based on said error signal.

2. The method according to claim 1, further including the step of filtering the error signal to remove noise prior to adjusting the frequency.

3. The method according to claim 1 wherein the correction value is the accumulated residence times in the network devices through which the messages pass between the master device and the slave device.

4. The method according to claim 3 wherein the messages are PTP Sync messages and the correction value is stored in the correction field of the PTP messages.

5. The method according to claim 3 wherein the messages are PTP Sync messages and the correction value is stored in a type, length, value field which is an extension to those messages.

6. The method according to claim 1 wherein the method repeats steps c) to f).

7. The method according to claim 6 wherein the method repeats steps c) to f) at all times when the slave device is operational.

8. A method of synchronising the frequency of an oscillator in a slave device to the frequency of a master clock in a master device, the method including the steps of:

a) receiving in the slave device a first message from said master device and recording a first value of a counter in the slave device at the time of receipt of the first message;

b) receiving in the slave device a second message from said master device, the second message having a first time-stamp which is a time-stamp of said master clock indicating the precise time of sending of said first message and a first correction value which is the cumulative delay encountered by the second message during its passage from the master device to the slave device c) extracting said time-stamp and said correction value from said second message;

d) receiving in the slave device a first further message from said master device and recording a further value of the counter in the slave device at the time of receipt of the further message;

e) receiving in the slave device a second further message from said master device, the second further message having a second time stamp which is a time-stamp of said master clock indicating the precise time of sending of said first further message and a second correction value which is the cumulative delay encountered by the second further message during its passage from the master device to the slave device;

f) extracting said time-stamp and said correction value from said second further message;

g) determining an error signal which is representative of the difference between the first time-stamp and the further time-stamp and the first value of the counter and the further value of the counter, adjusted by the difference between the first correction value and the further correction value; and h) adjusting the frequency of the oscillator based on said error signal.

9. The method according to claim 8, further including the step of filtering the error signal to remove noise prior to adjusting the frequency.

10. The method according to claim 8 wherein the correction value is the accumulated residence times in the network devices through which the messages pass between the master device and the slave device.

11. The method according to claim 10 wherein the second message and second further message are PTP Follow_Up messages and the correction value is stored in the correction field of the PTP messages.

12. The method according to claim 10 wherein the second message and second further message are PTP Follow_Up messages and the correction value is stored in a type, length, value field which is an extension to those messages.

13. The method according to claim 8 wherein the method repeats steps d) to h).

14. The method according to claim 13 wherein the method repeats steps d) to h) at all times when the slave device is operational.

15. An apparatus for synchronizing the frequency of a slave clock in a slave device which is communicatively coupled to a master device having a master clock, the slave clock comprising:

an oscillator; and
a pulse counter counting pulses from said oscillator;
the apparatus comprising:
a receiver receiving messages from said master device;
a time-stamp extraction device for extracting time-stamps applied to said messages by the master device;
a correction field extraction device for extracting values from a correction field contained in said messages; and
a phase detector,
wherein:
the receiver receives a first message from said master device having a first time-stamp which is a time-stamp of said master clock indicating the precise time of sending of said first message and a first correction value which is the cumulative delay encountered by the message during its passage from the master device to the slave device and records a first value of the counter at the time of receipt of the first message;
the time-stamp extraction device extracts said time-stamp from said first message;

the correction field extraction device extracts said correction value from said first message;

the receiver receives a further message from said master device having a second time stamp which is a time-stamp of said master clock indicating the precise time of sending of said further message and a second correction value which is the cumulative delay encountered by the message during its passage from the master device to the slave device and records a further value of the counter in the slave device at the time of receipt of the further message;

the time-stamp extraction device extracts said time-stamp from said further message;

the correction field extraction device extracts said correction value from said further message;

the detector determines an error signal which is representative of the difference between the first time-stamp and the further time-stamp and the first value of the counter and the further value of the counter, adjusted by the difference between the first correction value and the further correction value; and said oscillator adjusts its frequency of oscillation based on said error signal.

16. The apparatus according to claim 15 further including a filter which filters the error signal from said detector to remove noise and forms a control signal and wherein the oscillator adjusts its frequency of oscillation based on said control signal.

17. The apparatus according to claim 16 wherein said oscillator, counter, detector and filter form a phase-locked loop.

18. The apparatus according to claim 15 wherein the correction value is the accumulated residence times in the network devices through which the messages pass between the master device and the slave device.

19. The apparatus according to claim 18 wherein the messages are PTP Sync messages and the correction value is stored in the correction field of the PTP messages.

20. The apparatus according to claim 18 wherein the messages are PTP Sync messages and the correction value is stored in a type, length, value field which is an extension to those messages.

21. An apparatus for synchronizing the frequency of a slave clock in a slave device which is communicatively coupled to a master device having a master clock, the slave clock comprising:
   an oscillator; and
   a pulse counter counting pulses from said oscillator;
the apparatus comprising:
   a receiver receiving messages from said master device;
   a time-stamp extraction device for extracting time-stamps applied to said messages by the master device;
   a correction field extraction device for extracting values from a correction field contained in said messages; and
   a phase detector,
wherein:
   the receiver receives a first message from said master device and records a first value of the counter at the time of receipt of the first message;
   the receiver receives a second message from said master device, the second message having a first time-stamp which is a time-stamp of said master clock indicating the precise time of sending of said first message and a first correction value which is the cumulative delay encountered by the second message during its passage from the master device to the slave device;
   the time-stamp extraction device extracts said time-stamp from said second message;
   the correction field extraction device extracts said correction value from said second message;
   the receiver receives a further message from said master device and records a further value of the counter in the slave device at the time of receipt of the further message;
   the receiver receives a second further message from said master device, the second further message having a second time stamp which is a time-stamp of said master clock indicating the precise time of sending of said first further message and a second correction value which is the cumulative delay encountered by the second further message during its passage from the master device to the slave device;
   the time-stamp extraction device extracts said time-stamp from said second further message;
   the correction field extraction device extracts said correction value from said second further message;
   the detector determines an error signal which is representative of the difference between the first time-stamp and the further time-stamp and the first value of the counter and the further value of the counter, adjusted by the difference between the first correction value and the further correction value; and
   said oscillator adjusts its frequency of oscillation based on said error signal.

22. The apparatus according to claim 21 further including a filter which filters the error signal from said detector to remove noise and forms a control signal and wherein the oscillator adjusts its frequency of oscillation based on said control signal.

23. The apparatus according to claim 21 wherein said oscillator, counter, detector and filter form a phase-locked loop.

24. The apparatus according to claim 21 wherein the correction value is the accumulated residence times in the network devices through which the messages pass between the master device and the slave device.

25. The apparatus according to claim 24 wherein the messages are the second message and second further message are PTP Follow_Up messages and the correction value is stored in the correction field of the PTP messages.

26. The apparatus according to claim 24 wherein the second message and second further message are PTP Follow_Up messages and the correction value is stored in a type, length, value field which is an extension to those messages.

27. A frequency synchronisation system for a packet network, the system including:
   a master device having a master clock;
   a slave device having a slave clock; and
   a packet network connecting the master and slave devices, wherein:
   the slave clock comprises:
      an oscillator; and
      a pulse counter counting pulses from said oscillator;
   the slave device comprises a frequency synchronization apparatus comprising:
      a receiver receiving messages from said master device;
      a time-stamp extraction device for extracting time-stamps applied to said messages by the master device;
      a correction field extraction device for extracting values from a correction field contained in said messages; and
      a phase detector,
   wherein:
      the receiver receives a first message from said master device having a first time-stamp which is a time-stamp of said master clock indicating the precise time of sending of said first message and a first correction value which is the cumulative delay encountered by the message during its passage from the master device to the slave device and records a first value of the counter at the time of receipt of the first message;

the time-stamp extraction device extracts said time-stamp from said first message;

the correction field extraction device extracts said correction value from said first message;

the receiver receives a further message from said master device having a second time stamp which is a time-stamp of said master clock indicating the precise time of sending of said further message and a second correction value which is the cumulative delay encountered by the message during its passage from the master device to the slave device and records a further value of the counter in the slave device at the time of receipt of the further message;

the time-stamp extraction device extracts said time-stamp from said further message;

the correction field extraction device extracts said correction value from said further message;

the detector determines an error signal which is representative of the difference between the first time-stamp and the further time-stamp and the first value of the counter and the further value of the counter, adjusted by the difference between the first correction value and the further correction value; and said oscillator adjusts its frequency of oscillation based on said error signal.

28. The system according to claim 27 wherein the system further includes at least one further device connected to the packet network between the master and slave devices, wherein:

the further device is a transparent clock which forwards said messages and updates the correction field in the forwarded messages to account for the residence time of each message in the device.

29. The system according to claim 28 wherein the messages are PTP Sync messages and the further device is an end-to-end transparent clock which measures the transit time in the device and adds that time to the correction field of each Sync message that passes through the device.

30. The system according to claim 28 wherein the messages are PTP Sync messages and the further device is a peer-to-peer transparent clock which measures the transit time in the device and adds that time to a type, length, value extension field defined in the Sync messages for that purpose.

31. A frequency synchronisation system for a packet network, the system including:

a master device having a master clock;

a slave device having a slave clock; and a packet network connecting the master and slave devices, wherein:

the slave clock comprises:

an oscillator; and a pulse counter counting pulses from said oscillator;

the slave device comprises a frequency synchronization apparatus comprising:

the apparatus comprising:

a receiver receiving messages from said master device;

a time-stamp extraction device for extracting time-stamps applied to said messages by the master device;

a correction field extraction device for extracting values from a correction field contained in said messages; and a phase detector, wherein:

the receiver receives a first message from said master device and records a first value of the counter at the time of receipt of the first message;

the receiver receives a second message from said master device, the second message having a first time-stamp which is a time-stamp of said master clock indicating the precise time of sending of said first message and a first correction value which is the cumulative delay encountered by the second message during its passage from the master device to the slave device;

the time-stamp extraction device extracts said time-stamp from said second message;

the correction field extraction device extracts said correction value from said second message;

the receiver receives a further message from said master device and records a further value of the counter in the slave device at the time of receipt of the further message;

the receiver receives a second further message from said master device, the second further message having a second time stamp which is a time-stamp of said master clock indicating the precise time of sending of said first further message and a second correction value which is the cumulative delay encountered by the second further message during its passage from the master device to the slave device;

the time-stamp extraction device extracts said time-stamp from said second further message;

the correction field extraction device extracts said correction value from said second further message;

the detector determines an error signal which is representative of the difference between the first time-stamp and the further time-stamp and the first value of the counter and the further value of the counter, adjusted by the difference between the first correction value and the further correction value; and said oscillator adjusts its frequency of oscillation based on said error signal.

32. The system according to claim 31 wherein the system further includes at least one further device connected to the packet network between the master and slave devices, wherein:

the further device is a transparent clock which forwards said messages and updates the correction field in the forwarded messages to account for the residence time of each message in the device.

33. The system according to claim 32 wherein the second message and second further message are PTP Follow_Up messages and the further device is an end-to-end transparent clock which measures the transit time in the device and adds that time to the correction field of each Follow_Up message that passes through the device.

34. The system according to claim 32 wherein the second message and second further message are PTP Follow_Up messages and the further device is a peer-to-peer transparent clock which measures the transit time in the device and adds that time to a type, length, value extension field defined in the Follow_Up messages for that purpose.

* * * * *